US006567849B2

(12) United States Patent
Ludovici et al.

(10) Patent No.: US 6,567,849 B2
(45) Date of Patent: *May 20, 2003

(54) SYSTEM AND METHOD FOR CONFIGURING AND ADMINISTERING MULTIPLE INSTANCES OF WEB SERVERS

(75) Inventors: David S. Ludovici, Owego, NY (US); Frank V. Paxhia, Binghamton, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,149

(22) Filed: Aug. 17, 1998

(65) Prior Publication Data

US 2002/0002607 A1 Jan. 3, 2002

(51) Int. Cl.[7] .............................................. G06F 15/173
(52) U.S. Cl. ..................... 709/223; 709/220; 709/221; 709/222
(58) Field of Search ................................. 709/223, 220, 709/221, 222

(56) References Cited

U.S. PATENT DOCUMENTS

| | | | |
|---|---|---|---|
| 5,394,522 A | * | 2/1995 | Sanchez-Frank et al. ... 345/735 |
| 5,475,819 A | * | 12/1995 | Miller et al. ................. 709/203 |
| 5,495,607 A | | 2/1996 | Pisello et al. ................ 395/600 |
| 5,734,831 A | * | 3/1998 | Sanders ....................... 709/223 |
| 5,774,660 A | * | 6/1998 | Brendel et al. .............. 709/201 |
| 5,774,668 A | * | 6/1998 | Choquier et al. ............ 709/223 |
| 5,857,102 A | * | 1/1999 | McChesney et al. ........ 713/100 |
| 5,870,550 A | * | 2/1999 | Wesinger, Jr. et al. ...... 709/218 |

(List continued on next page.)

OTHER PUBLICATIONS

Damore, HP broadens server line, unveils PC management tools, Computer Reseller News, Mar. 10, 1997, Issue 726, pp. 16ff.*

(List continued on next page.)

Primary Examiner—Glenton B. Burgess
Assistant Examiner—Bradley Edelman
(74) Attorney, Agent, or Firm—Shelley M. Beckstrand

(57) ABSTRACT

System and method for serving HTML pages to web browsers for the purpose of administration and configuration. A plurality of instances of WWW servers is provided, with one such instance including a configuration file which is restricted in usage and not alterable by way of any HTML configuration or administration forms. This plurality of instances of internet connection servers is managed by way of a web browser which displays and interacts with a plurality of HTML forms and corresponding common gateway interface binary programs which are provided selectively for creating and deleting instances of servers, associating a configuration file with a server instance, changing server instance start up parameters, and starting, ending, and restarting server instances.

4 Claims, 19 Drawing Sheets

U.S. PATENT DOCUMENTS

| | | | | | |
|---|---|---|---|---|---|
| 5,956,489 | A | * | 9/1999 | San Andres et al. | 709/221 |
| 5,974,462 | A | * | 10/1999 | Aman et al. | 709/225 |
| 5,996,012 | A | * | 11/1999 | Jarriel | 709/226 |
| 6,026,438 | A | * | 2/2000 | Piazza et al. | 709/221 |
| 6,052,719 | A | * | 4/2000 | Bezanson et al. | 709/220 |
| 6,061,349 | A | * | 5/2000 | Coile et al. | 370/389 |
| 6,061,713 | A | * | 5/2000 | Bharadhwaj | 709/203 |
| 6,092,096 | A | * | 7/2000 | Lewis | 709/200 |
| 6,098,067 | A | * | 8/2000 | Erickson | 707/10 |
| 6,098,097 | A | * | 8/2000 | Dean et al. | 709/220 |
| 6,105,063 | A | * | 8/2000 | Hayes, Jr. et al. | 709/223 |
| 6,119,170 | A | * | 9/2000 | Schoffelman et al. | 709/244 |
| 6,128,016 | A | * | 10/2000 | Coelho et al. | 345/347 |
| 6,170,017 | B1 | * | 1/2001 | Dias et al. | 709/235 |
| 6,219,700 | B1 | * | 4/2001 | Chang et al. | 709/222 |
| 6,279,001 | B1 | * | 8/2001 | DeBettencourt et al. | 707/10 |
| 6,324,690 | B1 | * | 11/2001 | Luu | 717/11 |

OTHER PUBLICATIONS

IBM Technical Disclosure Bulletin, "Graphical User Interface for Managing Nodes in a Distributed System", Feb. 1992, US, vol. 34, Issue 9, pp. 160–162.*

Karamanolis et al., A replication protocol to support dynamically configurable groups of servers, May 1996, Configurable Distributed Systems, 1996. Proceedings: Third International Conference on, pp. 161–168.*

Cole, Application configuration in a client–server distributed system, 1992, Configurable Distributed Systems, 1992., International Workshop on, pp. 309–317.*

Ghlamallah et al., Implementing a distributed Web–based management system in Java, Aug. 1998, Telecommunications Symposium 1998. ITS '98 Proceedings. SBT/IEEE International, vol. 2, pp. 554–559.*

Boyle et al., Providing a Web–based view of your managed network, Jun. 1997, Communications, 1997. ICC '97 Montreal, Towards the Knowledge Millenium. 1997 IEEE International Conference on, vol. 2, pp. 894–898.*

Koster. *Archie–Like Indexing in the WEB*, Comput. Netw. ISDN Syst., vol. 27, No. 2, pp. 175–82, Nov. 1994. INSM AN 4842959.

Voegele, et al. *Slinky: a URL server*, Proceedings. The First Annual Conference on Emerging Technologies and Applications in Communications, IEEE Comput. Soc. Press, pp. 120–3, 1996. INSM AN 5335261.

* cited by examiner

/— 460

```
Configuration and Administration Forms-Netscape        _ □ X
File   Edit   View   Go   Communicator   Help
□ Bookmarks    □ Go to  [http://YourAS400Host2001/QSYS.LIB/QTCPCGI.LIB/QTMHFMIN.PGM/cfgact=TEAM42] ▽ N
```

Configuration and Administration Forms
Configuration: TEAM42         461

You can customize this server configuration by modifying the forms below
- Basic—Specify required settings —462
- User Administration—Manage user ID and passwords—463        464
  - Add User—Add a new user ID to a validation list and group file
  - Delete User—Delete a user from a validation list——465
  - Check User—Determine if a user exists in a validation list—466
  - Change Password—Change a user password in a validation list
- Directories and Welcome Page—Set viewing options—468    467
  - Initial Page—Specify welcome pages and directory lists—469
  - Directory List Contents—Specify list columns——470
  - Readme Text—Provide informative directory list text—471
- Logging—Customize access log and error log—472
  - Global Log File Configuration Settings—Specify log formats—473
  - Access Log File Configuration—Specify access log location—474
  - Error Log File Configuration—Specify error log location—475
- Access Control—Set up access control for the server—476
  - Document Protection—Specify file directories to protect—477
  - Protection Setups—Specify file protection settings—478
  - Access Control Lists—Define user access files—479
- Security—Set up security for the server—480
  - Security Configuration—Define basic parameters for security—481
  - Create Keys—Create keys and requests certificates—482
  - Receive Certificate—Receive a certificate into the key ring—483
  - Key Management—Work with keys, root keys, and certificates—484
- Resource Mapping—Redirect URLs and define file extensions —485
  - Request Routing—Route URL requests to server files—486
  - MIME Encodings—Define encodings and extensions —487
  - MIME Types—Define file types and extensions—488
  - Languages—Associate language encodings and extensions—489
- TimeOuts—Close connections automatically—490
- Methods—Set method acceptance—491
- Accessory Scripts—Specify custom method scripts—492
- Performance Settings—Define performance settings—493
  - Jobs—Configure jobs—494

Document Done

CONFIRMATION /— 520

DIRECTIVE: HOSTNAME LUDOVIDS

DIRECTIVE: PORT 80

DIRECTIVE: SERVERROOT E:\WWW.BIN

DIRECTIVE: DNS-LOOKUP OFF

DIRECTIVE: IMBEDS OFF

< MESSAGE >

SYSTEM AND METHOD FOR CONFIGURING AND ADMINISTERING MULTIPLE INSTANCES OF WEB SERVERS

CROSS-REFERENCES TO RELATED APPLICATIONS

U.S. patent applications Ser. No. 09/135,147 filed Aug. 17, 1998 entitled "SYSTEM AND METHOD FOR AN ADMINISTRATION SERVER", and 09/135,253 filed Aug. 17, 1998 entitled "SYSTEM AND METHOD FOR PORTING A MULTITHREADED PROGRAM TO A JOB MODEL", now U.S. Pat. No. 6,272,518 are filed concurrently and assigned to the same assignee. They contain related subject matter incorporated herein by this reference.

BACKGROUND OF THE INVENTION

1. Technical Field of the Invention

This invention pertains to configuration and administration of system components using World Wide Web (WWW) technology. In particular, this invention provides a plurality of instances of web server, with one of them being preconfigured for this administration function to allow web browsers to configure web-configurable components.

2. Background Art

The IBM AS/400 system traditionally uses 5250 terminal protocol to configure and administer system components, such as start or stop a server, change functional attributes, authorize users, and so forth. This 5250 terminal protocol requires a 5250 terminal or 5250 emulator that is known as a green screen display. A graphical user interface (GUI) presents to a user a much more user-friendly interface than a green screen display, and there is a need in the art to provide a graphical user interface for system configuration and administration functions.

It is quite common today for any system to have a web server that hosts some site or sites. Such sites provide web content that is made available to web browsers. In general the goals of an enterprise with such a site are typical business goals that pertain to return on investment or customer satisfaction. Typically, such an enterprise has system sites that deal with business applications (such as an electronic shopping mall), or information sites (such as the company's product specifications, or employee benefit plans). These sites share in common the protocols that make web browsing possible. These include use of the HyperText Transfer Protocol (HTTP) and HyperText Markup Language (HTML), a Common Gateway Interface (CGI) that allows system administrators to write dynamic web applications, and the content itself, that is the HTML files, images, java applets, wave (audio) files, or other multimedia resources known to (that is, accessible by) browsers.

Some servers have the ability to manage other servers. However, systems today do not have multiple copies of those servers, and there is a need in the art for an administration server capable of managing multiple copies or instances of servers.

Further, there is a need in the art for an administration Internet connection server (ICS) that is a web (HTTP) server for serving a specialized set of applications that provide for configuration and administration of web enabled system components. These system components can be anything on an enterprise or site system that have an application written for and served by an administration server for the purpose of being configured by a web browser.

However, for security purposes, this administration Internet connection server must not share commonality with other ICS HTTP server(s) serving the web content that is made available by the site system to web browsers. Such an administration server preferably allows a user to configure certain aspects of the server, such as access and error logging, or the ability to run secure HTTP transactions (also referred to as HTTPs). However, this administration server must be controlled with respect to serving its content to browsers irrespective of such configuration by the user.

Further, there exists the need in the art to provide an administration Internet connection server (also referred to as an administration server) which is isolated from and therefore does not detract in any way from other, or "normal", HTTP server(s) at the site, and does not impose any requirements that the system use its "normal" web server(s) for what is considered system administration and configuration. It is particularly important that any changes the site makes to configuration of its "normal" HTTP server(s) (good or bad) cannot affect the configuration of the administration server. Furthermore, it is a requirement that any heavily loaded "normal" web server(s) at a site will not affect performance of the administration server, and conversely, the act of using the administration server, that is configuring and administering some system component, will not have any effect of the performance of other HTTP server(s) at the site.

It is an object of the invention to provide an improved administration server.

It is a further object of the invention to provide an administration server which serves administration and configuration applications to a browser's graphical user interface.

It is a further object of the invention to provide an administration server which serves to a browser capability for administering and configuring web enabled system components.

It is a further object of the invention to provide an improved administration server which is isolated from other servers at the site.

It is a further object of the invention to provide an improved administration server which is isolated from other servers at the site such that loading of either does not adversely impact the other.

It is a further object of the invention to provide an improved administration server which enables the management of multiple copies or instances of servers.

It is a further object of the invention to provide an administration server implemented as a browser.

SUMMARY OF THE INVENTION

In accordance with the invention, a system and a method is provided for managing a plurality of instances of Internet connection servers. A web browser displays and interacts with a plurality of HTML forms and corresponding common gateway interface binary programs which are provided selectively for creating and deleting instances of servers, associating a configuration file with a server instance, changing server instance start up parameters, and starting, ending, and restarting server instances.

Other features and advantages of this invention will become apparent from the following detailed description of the presently preferred embodiment of the invention, taken in conjunction with the accompanying drawings.

BRIEF DESCRIPTION OF THE DRAWINGS

FIG. 12 is a diagram illustrating a representation of configuration and administration in accordance with the preferred embodiment of the invention.

FIG. 14 is a diagram illustrating a confirmation page.

BEST MODE FOR CARRYING OUT THE INVENTION

In accordance the preferred embodiment of the invention, an hypertext transfer protocol (HTTP) web server is provided for serving browsers. A web server that supports the industry standard HTTP protocol is given a hardened (e.g., read only) configuration. A task page is provided that provides links to any application that can be configured via a browser. This one task page is served by this administration HTTP server. Upon selecting a link to a configurable application, the selected pages which are also served by the administration HTTP server, are used to complete the configuration task. The user interface throughout this process is the browser.

The pages, and forms contained therein, are accessed by a series of links from the tasks page, and provide the graphical user interface (GUI) for configuring and administering those applications. Examples of such applications include internet connection secure server, firewall, net.data, digital certificate manager, net.commerce and net.question. These become a link off of the tasks page and each provides a series of web pages which are traversed to achieve the desired configuration.

In accordance with the invention, forms are designed and implemented so that an internet connection server can be configured. A configuration file for an Internet connection server is built by selecting and entering values upon these forms. One or more copies or instances of the Internet connection server are provided, and these forms are used to manage these multiple instances. The administration server of this invention enables creation, selection and modification of other server instances by leading an authorized user at a browser through a series of GUI forms to accomplish the change, addition, start, stop, or other action.

For example, a plurality of instances of Internet connection servers (ICSs) exist at a site and need to be managed. A form is presented by the administration server listing this plurality of other servers, and the user selects the instance (that is, the other server) he needs to administer (start, stop, change, add, delete). Upon selecting a server and an action, a page is presented or displayed at the browser by the administration server which will allow further configuration, the content of that page depending upon the action selected.

In accordance with the preferred embodiment of the invention, there is provided an administration server that is accessed via a web browser.

Figure 1:
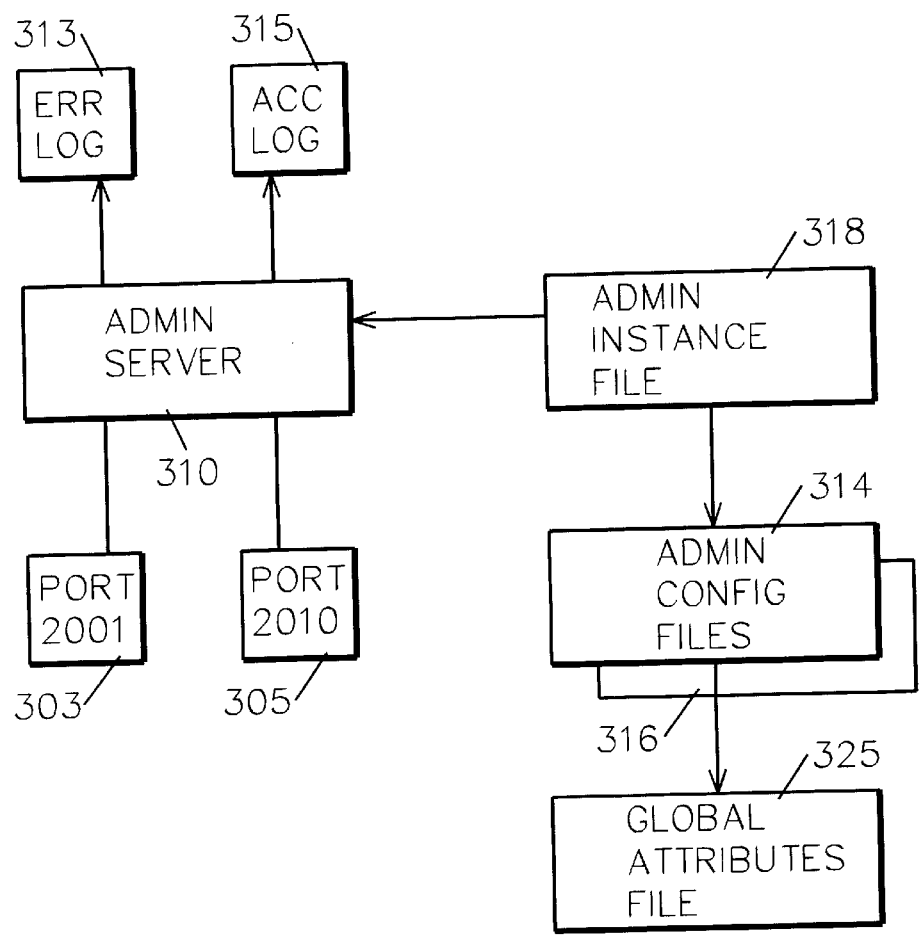
FIG. 1 is a high level system diagram of the administration server of the invention.
Figure 2:
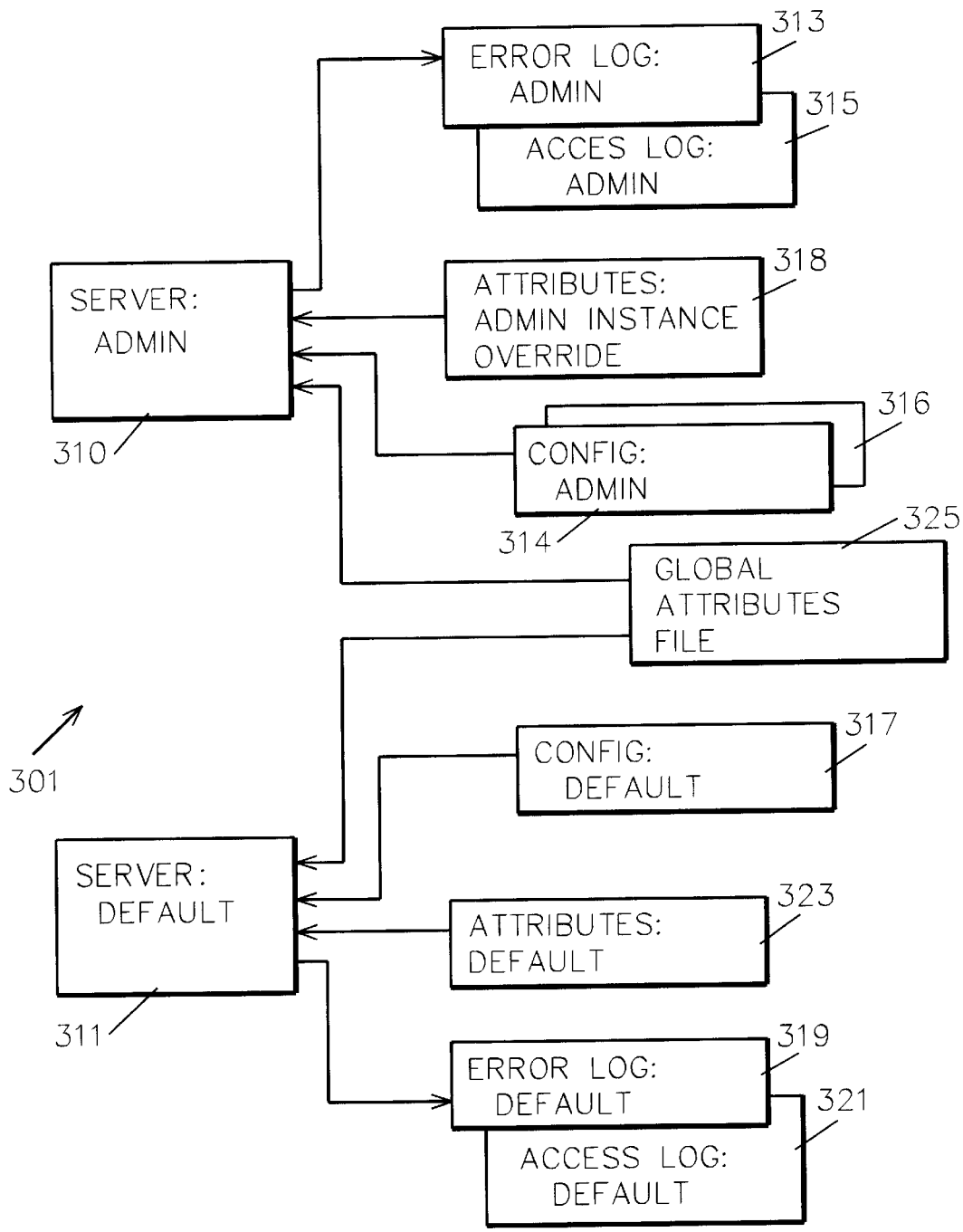
FIG. 2 is a high level system diagram illustrating the a administration server of the invention as one instance of multiple server instances.

Referring to FIGS. 1 and 2, ADMIN server 310 represents an instance of an HTTP server. In this preferred embodiment, there are provided an instance file 318 with one member and a configuration file with one member pair 314, 316 called ADMIN for installation separate and distinct from another instance 311 and configuration file 317 that are also provided for installation, but for a system administrator s use. A global attributes file 325 is provided. Instance file 317 overrides the contents of the config file(s) 314, 316, which overrides the contents of the attributes file 325. Attributes file 325 is referred to as the global attributes file because there is only one file member, used by all server instances; whereas each instance uses a unique instance file member 318 and a particular configuration (config) file member 314 (except admin server 310, which uses 2 config file members 314, 316 ).

In accordance with a preferred embodiment of the invention, an Internet connection secure server has a default setup that includes two HTTP server instances 310, 311. One instance is the ADMIN server 310 that is required for configuration and the other is DEFAULT server 311. Default server 311 can be started as-is with all of its default settings 317, 319, 321, 323. The server administrator can customize the default server 311 for his own environment and add additional servers as desired.

Figure 7:
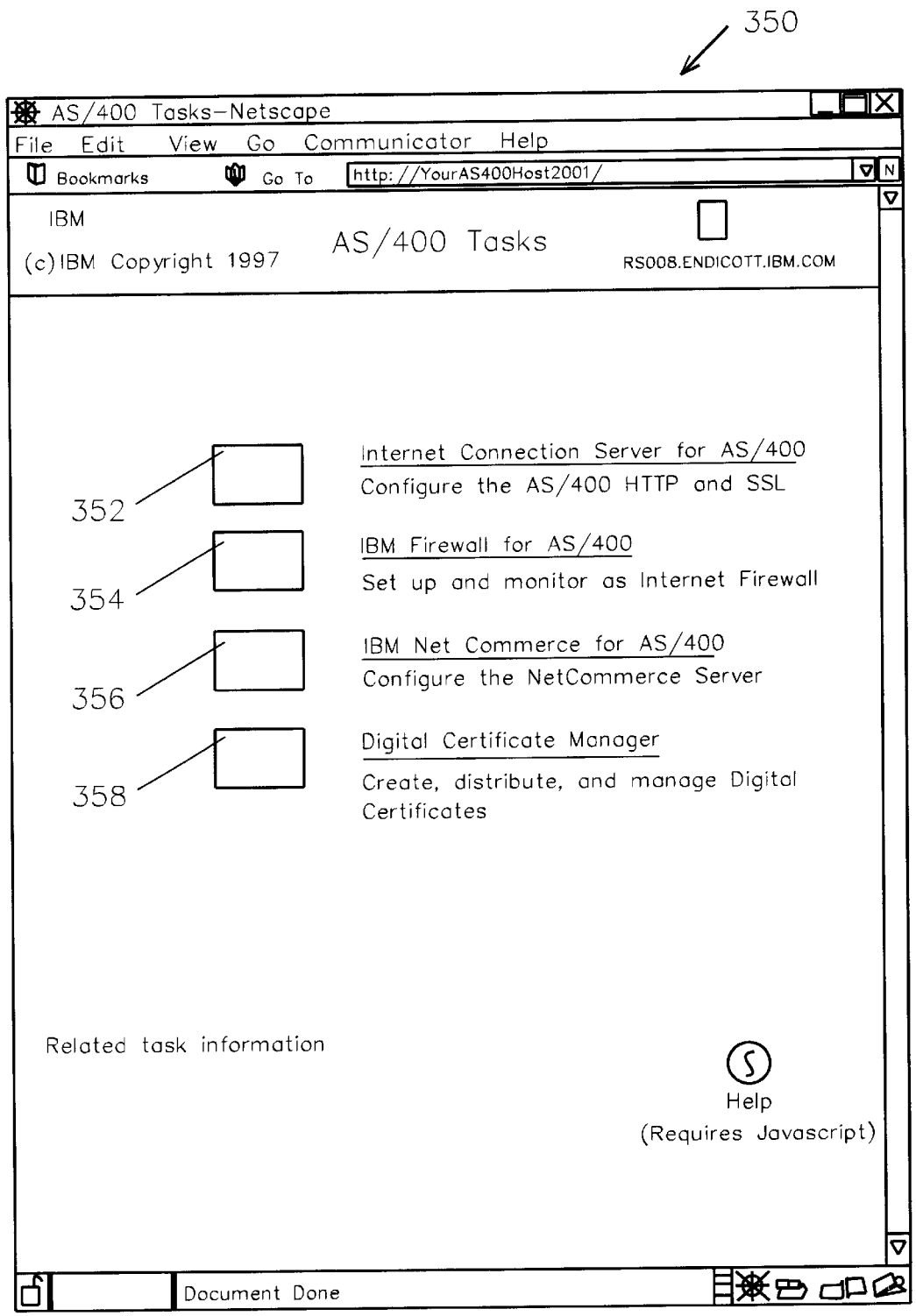
FIG. 7 is a diagram illustrating the AS/400 tasks page.

Referring to FIG. 2 in connection with FIG. 7, in accordance with a preferred embodiment, ADMIN server 310 serves an AS/400 configuration home page 350 that links to other browser configurable products, such as is represented by link 352. In operation, when the user (that is, the system administrator) points his browser (this is analogous to saying as400hostname.domain:2001 ) to the system administration home page, the browser is presented with a page 350 asking what is to be administered or configured, including a hot link 352 to HTTP server configuration pages, or alternatively a different page showing configuration screens for the other products.

Upon selecting link 352, the user is presented initial page 360. Upon selecting configure HTTP servers 362 on initial page 360, the system administrator is presented a general configuration and administration form 370 (also referred to as the server instance form or instance manager page). The system administrator is in this manner allowed to select either an instance 371 to work with, add a new instance, or change the default attributes that potentially affect all HTTP servers. Additionally, a user may choose the other hotlinks 364, 366, 368 on this initial page 360 to see some sample home pages, some URLs for help, or to return to initial page 350.

Figure 3:
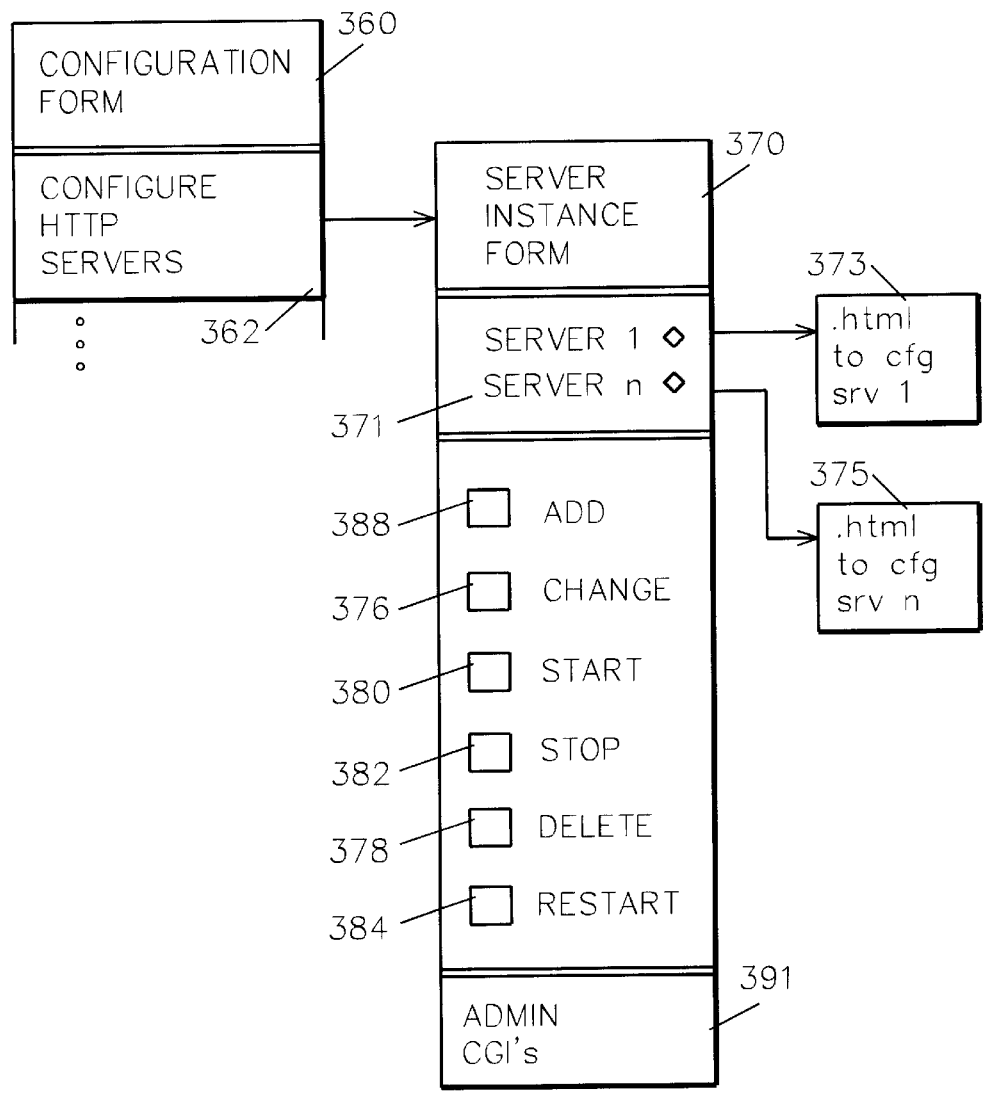
FIG. 3 is a diagrammatic representation of the configuration and server instance forms presented by the administration server of the invention at a graphical user interface.

Referring to FIG. 3, instance manager page 370 provides various choices for working with an instance 371, including CHANGE 376, DELETE 378, START 380, STOP 382 and RESTART 384. Appropriate messages for these commands are shown after the command has executed. Help text is provided to guide a user through the steps. These selections are then turned into appropriate control commands in the case of START 380, STOP 382 or RESTART 384, or will delete an instance 371 in the instance file 318 if DELETE 378 is selected.

In accordance with a preferred embodiment of the invention, an interface for configuring the AS/400 Secure Web Server includes web pages and CGI scripts and a configuration file validation program. However, the web-based configuration function of the preferred embodiment of the invention does not use a separate validation program. Rather, validation of user entries in the configuration pages 316 is built into the CGI programs. Which CGI program gets invoked depends on which button (Apply, Change, . . . ) is pushed or which link (i.e., Global Attribute Values) is clicked, regardless of the rest of the page content. These CGI programs produce the code set forth in Tables 4–9.

The CGI scripts read current settings from the configuration file and build configuration pages filled in with those settings. CGI scripts are also used to read the values contained in the configuration pages and write those values out to the configuration file. These scripts may be modified to read or write from or to a configuration file 314 or an instance file 318, as appropriate. As will be apparent to those skilled in the art, this is common cgi usage, and need not be further described.

In accordance with a preferred embodiment of the invention, secure server configuration proceeds as follows:

1. The user opens the Internet Connection Server for AS/400 ' page.

Figure 9:
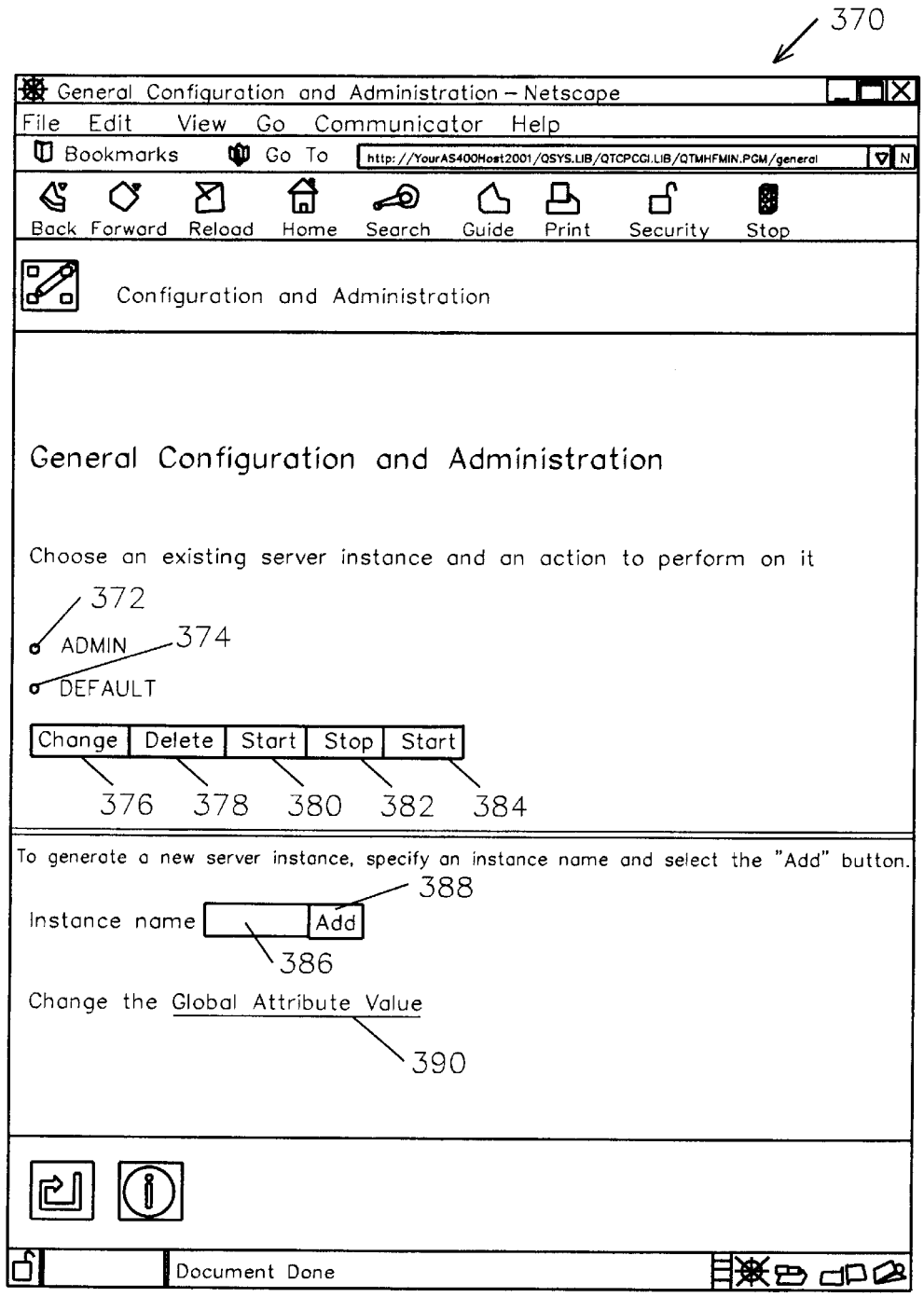
FIG. 9 is a diagram illustrating the general configuration and administration page for adding a new ICS server instance or to manage an existing one in accordance with the preferred embodiment of the invention.

2. As each general configuration and administration form 370 (FIG. 3, a specific example of which is illustrated in FIG. 9 as form 370 ) is accessed, the "in" CGI script 391 obtains the appropriate values from the configuration file 316, instance file 318, global attributes file 325 and builds, for example, a page 400 (FIG. 10), which is filled in with those values and displayed to the user at the browser.

3. If the user clicks on the "Apply" button 412 (FIG. 10), an "out" CGI script 391 calls a validation routine. If valid, the configuration directives are written to the instance file 318 and a confirmation page is returned. Otherwise, an error page is returned.

4. If the user clicks on "Reset" button 414 (FIG. 10), the web browser 304 resets the input fields.

Figure 4:
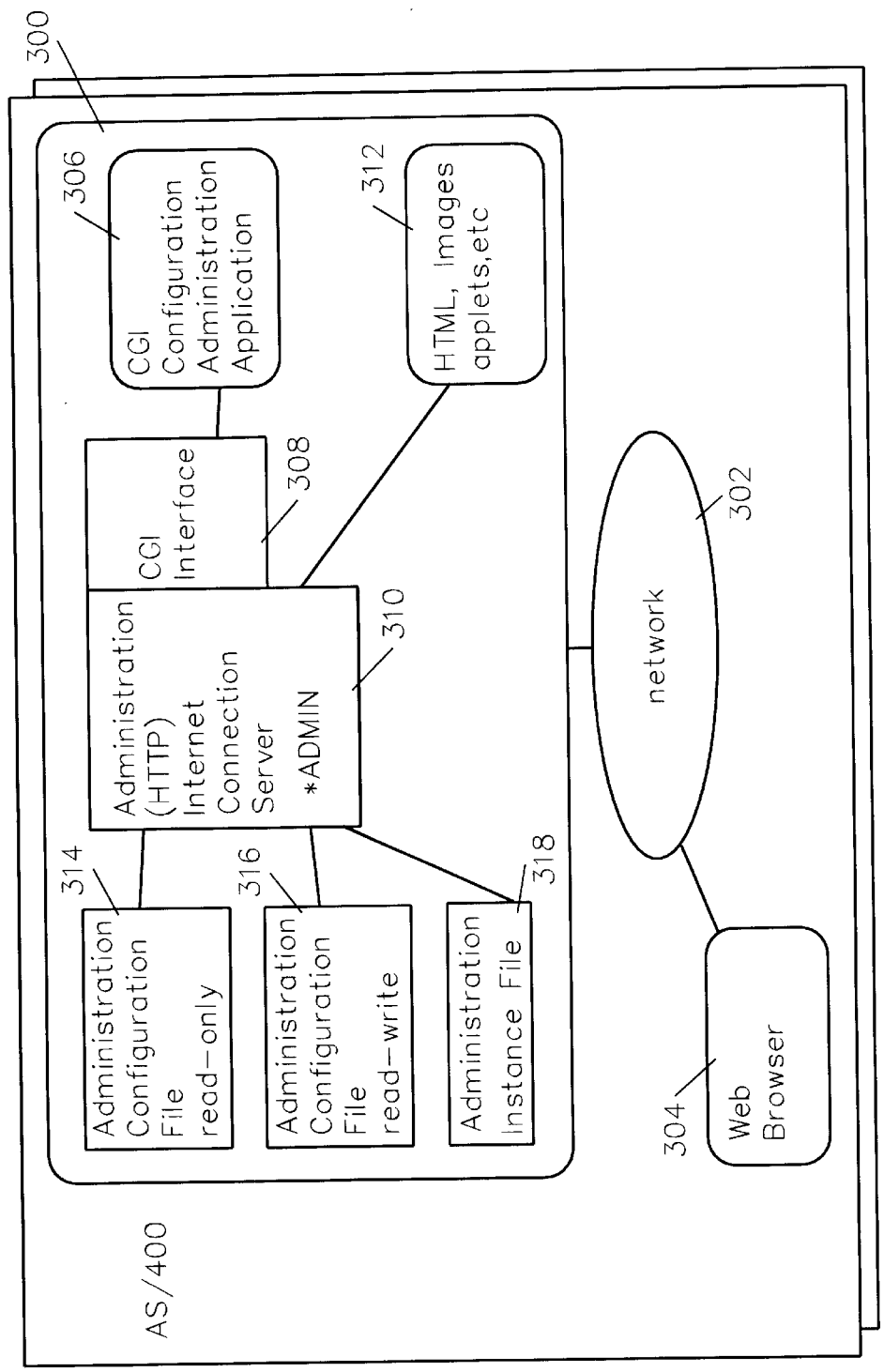
FIG. 4 is a high level system diagram illustrating the main components of the system of the invention.

Referring to FIG. 4, another view of the main components characterizing the environment of the administration and configuration system *ADMIN 310 of the invention includes system 300 and web browser 304 in communication over a network 302. In accordance with the preferred embodiment of the invention, web browser 304, any industry compliant web browser, is the user interface required to use this *ADMIN server 310. (An alterntive user interface is described hereafter in connection with start TCP server command 540 and end TCP server command 550, FIGS. 16 and 17, respectively.) Web browser 304 communicates through network 302 using HTTP protocols to the Administration (HTTP) Internet Connection Server (ICS) 310, also referred to as *ADMIN server 310.

*ADMIN server 310 is started, and it's functionality is controlled, via administration instance file 318, read-only administration configuration file 314, read-write administration configuration file 316, and global attributes file 325. The system administrator can change configuration file 316 in order to maintain system compatibility; however, read-only administration configuration file 314 contains those parameters which are required to be served by *ADMIN server 310 to browser 304, and cannot be altered by the system administrator. That is, read-only configuration file 314 is hardened: while all directives can be put in read-write configuration file 316, they will not override all of the directives that are in read-only file 314. The contents of file 314 are shown in Table 3. Server 310 provides a Common Gateway Interface (CGI) 308 for the purpose of executing CGI applications 306. These applications 306 are described later.

It is quite common today for any system to have a web server that hosts some site or sites. Such sites provide web content 312 that is made available to web browsers 304, such as information sites (for example, the company's product specifications, or employee benefit plans). These sites share in common the protocols that make web browsing possible, that is the HyperText Transfer Protocol (HTTP) and HyperText Markup Language (HTML), a Common Gateway Interface (CGI) 308 that allows system administrators to write dynamic web applications 306, and content files 312 such as HTML files, images, java applets, wave (audio) files, or other multimedia resources known to browsers.

Administration (HTTP) Internet Connection Server (*ADMIN server) 310 is a web (HTTP) server, however it serves a specialized set of applications 306, namely those that deal with the configuration and administration of web enabled system components. These system components 306 can be anything on the system that has been web enabled. By web enabled is meant that an application 306 has been written and served via the *ADMIN server 310 for the purpose of being configured via a web browser 304.

*ADMIN server 310 is unique (from other servers) in that it does not share any commonality with the System administrator's ICS (HTTP) server(s) 311—that is it is a separate instance of the ICS server, with separate configuration and instance files 316 and 318, and a specific URL (Uniform Resource Locator). *ADMIN server 310 also has a special "read-only" configuration file 314 that is shipped and installed with the *ADMIN server 310 so the operation of the *ADMIN server 310 can be controlled with regards to serving its content, irrespective of what the system administrator may want to configure from browser 304. In accordance with this preferred embodiment, the system administrator is allowed to configure certain aspects of the server such as access and error logging, or the ability to run secure HTTP (HTTPs) transactions.

Figure 11:
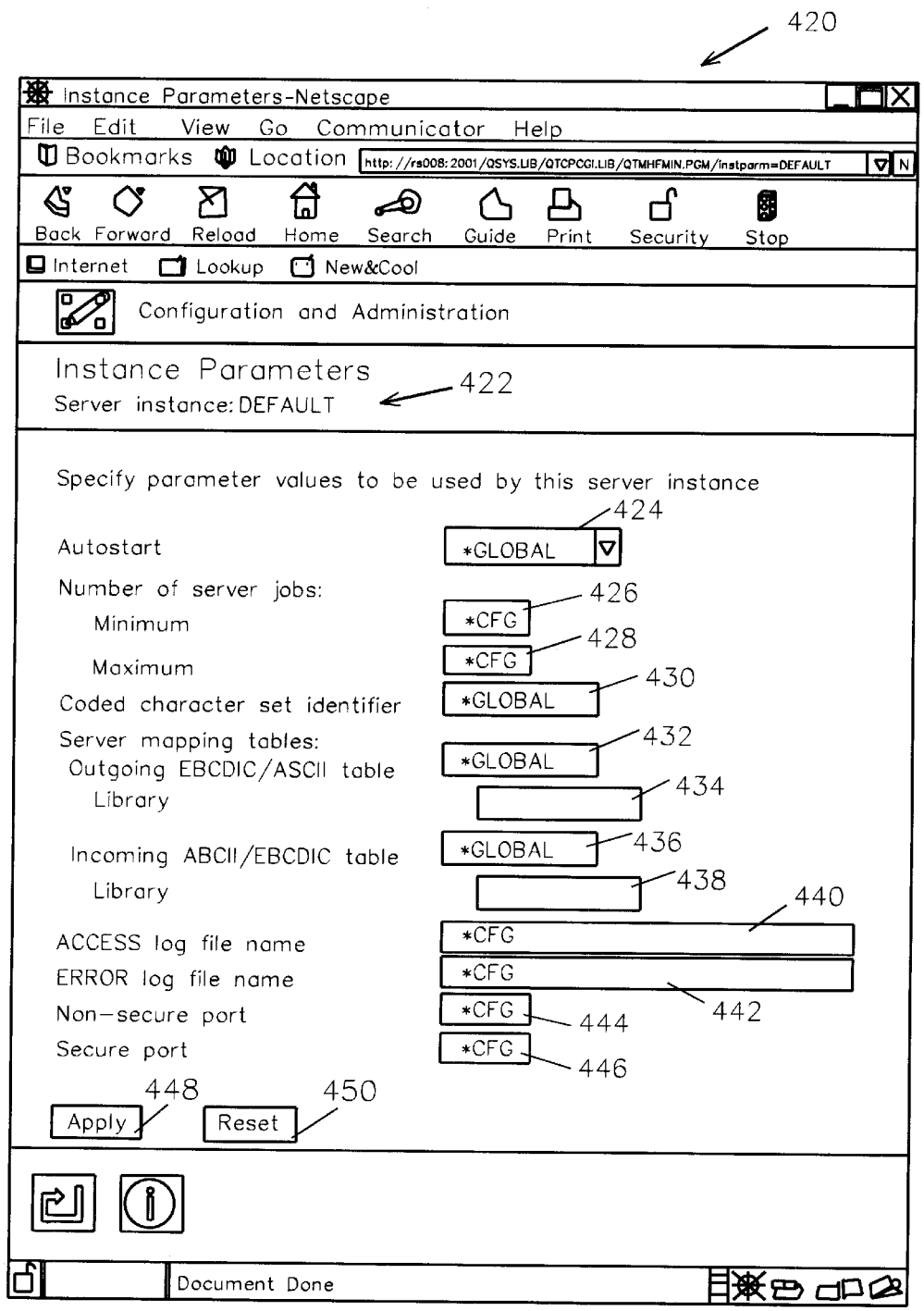
FIG. 11 is a diagram illustrating a representation of instance parameters in accordance with the preferred embodiment of the invention.

Read-only configuration file 314 is read by the web server before read-write configuration file 316. There are some directives which affect web serving in such a way that the first directive encountered that covers a particular web activity is the directive that will be used to control that activity. In effect, these directives cannot be overridden. They include Protect, Map, Pass, and Exec. Thus, much of the usage of the server that is controlled by the contents of the read-only file 314 will not be overridden by the contents of the read-write file 316. Instance parameters 318 would override the contents of the read-only file 314, but are limited in number, and are shown in FIG. 11. For example, the contents of the read-only file 314 allows the tasks page to be served, and this behavior cannot be overridden.

Thus, *ADMIN server 310 does not detract in any way from the system administrator's "normal" HTTP server(s) 311, and does not impose any requirements that the system administrator use his normal web server(s) 311 for what is considered system administration and configuration. The web-site (content) the system administrator wants to host is separate and distinct from *ADMIN server 310, and any changes the system administrator at browser 304 makes to his "normal" HTTP server(s) 311 configurations 317 (good or bad) cannot affect the configuration 314, 316 of *ADMIN servers 310. Furthermore, any heavily loaded system administrator's "normal" web server(s) 311 will not affect performance of *ADMIN server 310, and conversely, the act of using *ADMIN server 310, that is configuring and administering some system component 306, will not have any effect on the performance of the system administrator's other HTTP server(s) 311.

In order to keep the content of *ADMIN server 310 separate and distinct from the "normal" HTTP server(s) 311, it is necessary to provide a unique URL (Uniform Resource Locator) so browser 304 can access the home page of *ADMIN server 310. There are two different approaches to achieving this unique URL. The first is to provide a unique host address, and the URL would be: http://some_unique_address. However, the system administrator would have to configure this, thereby implying a multi-homed host 300, and obtain a separate IP address which may prove to be difficult. The second approach is to "port qualify" the URL so that instead of using the well known port for HTTP (which is port 80), and the well known port for HTTPs (which is port 443), a different port 303, 305 is chosen for each protocol, namely port 2001 for HTTP, and 2010 for HTTPs. Since it is possible to have a conflict with other socket applications, these ports are configurable. The URL for *ADMIN server 310 then becomes http://your_host_name: 2001—this is what the system administrator would enter at browser 304 to access the home page 350 (FIG. 7) of *ADMIN server 310.

In accordance with this preferred embodiment, implementation of *ADMIN server 310 includes the following: an industry standard HTTP server 310 that has a CGI interface 308; the ability to have (execute) multiple copies of an HTTP—ICS server, including *ADMIN server 310 and at least one other server 311; control of this *ADMIN server 310 by means of a configuration file 314, 316, instance file 318 and global attributes file 325; separate and distinct configuration and instance files 317 for the other ICS server(s) 311; a "read-only" configuration file 314 that guarantees operation of the *ADMIN server 310 (this file 314 is shipped by the manufacturer to the customer whose system 301 this is); a "read-write" configuration file 316 giving the system administrator the ability to configure some aspects of *ADMIN server 310; the ability to configure *ADMIN server 310 to bind to ports 303, 305 different than the well known HTTP and HTTPs ports. CGI interface 308 provides connection between the configuration pages and the CGIs.

Figure 5:
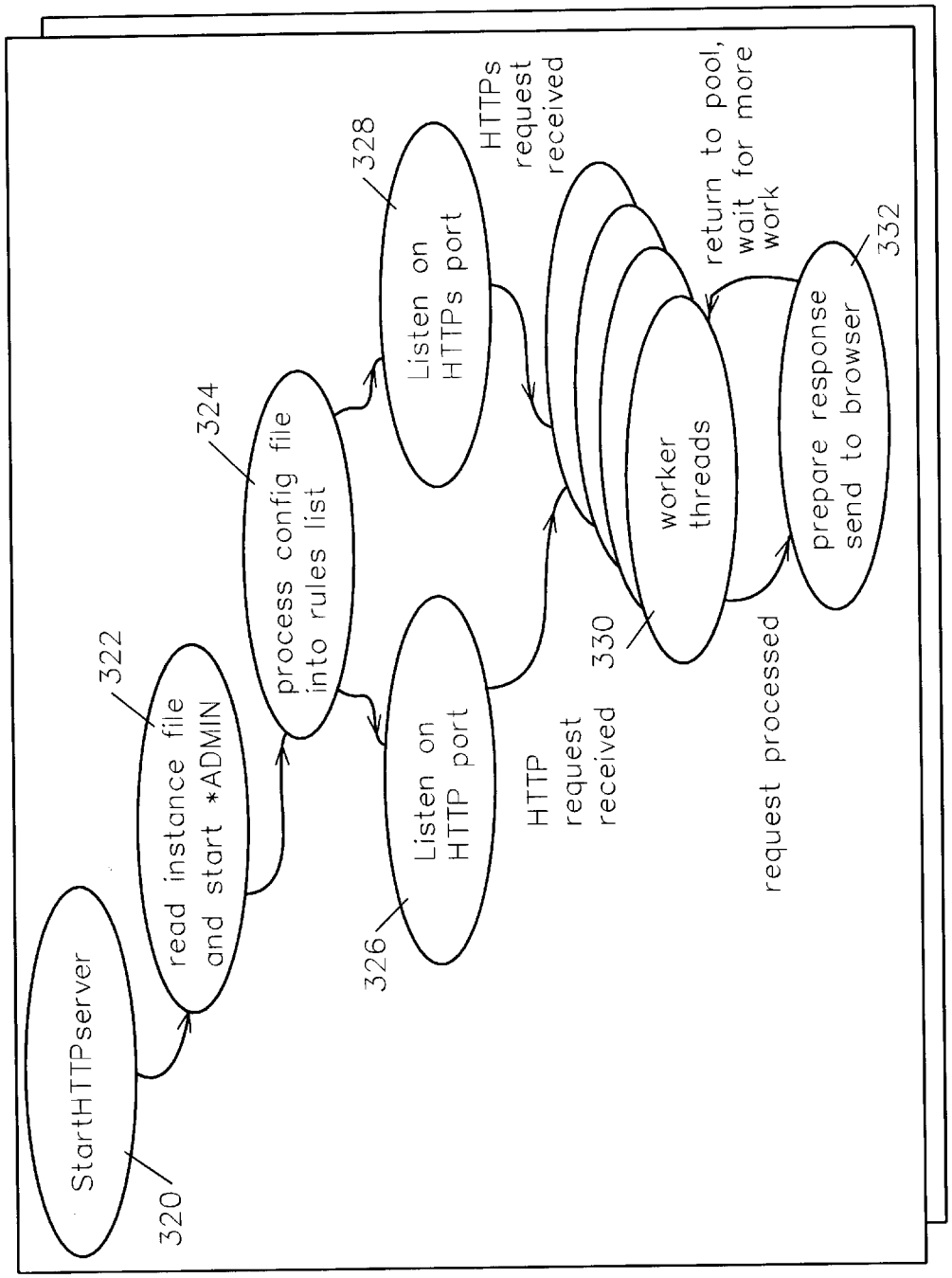
FIG. 5 is a flow diagram of the method of the invention.

In operation, referring to FIG. 5, after a start command 320 is received, in step 322 * ADMIN instance file 318 is read and appropriate parameters are passed to the main thread of the program. In step 324, the main thread then reads the configuration files 314, 316, builds a rules list from them, and then connects to the HTTP (and perhaps HTTPs) ports. In steps 326 and 328, the main thread of server 310 listens (waits) on the HTTP port, and the SSL listener thread listens (waits) on the HTTPs port for work to arrive (that is, requests from browser 304), and then passes these requests to a non-busy worker thread 330 from a managed pool of worker threads. Worker thread 330 is so named since it does all the work, reading, parsing and comparing the request against the rules list, and then acting on the rules that are encountered. When processing by worker thread 330 is complete, it returns information of some kind to browser 304, which may be the resource 312 requested, output of a CGI application 306, or an error message.

The threads model used for executing ADMIN server 310 is further described in U.S. Pat. No 6,272,518, filed Aug. 17, 1998, entitled "SYSTEM AND METHOD FOR PORTING A MULTITHREADED PROGRAM TO A JOB MODEL", the teachings of which are herein incorporated by this reference.

In Table 1, a further elaboration on the operation of of *ADMIN server 310 is set forth in pseudo code. In Table 1, comment lines are preceded by //.

TABLE 1

*ADMIN Server

```
// pseudo code for Server 310
// error handling is not shown here but is required for
// product level implementations
    START TCP SERVER COMMAND 320 RECEIVED INDICATING START
    *ADMIN SERVER 310 OR START TCP COMMAND RECEIVED AND
    AUTOSTART=*YES
    READ AND PARSE *ADMIN SERVER INSTANCE FILE 318
    START MAIN *ADMIN THREAD WITH ANY OVERRIDE PARAMETERS
//main thread processing
    SETUP SIGNAL HANDLERS
// useful for such things as realizing the end tcp server
// command has been issued. This way polling is avoided
// for the end command, and the main loop can do real work
    READ AND PARSE CONFIGURATION FILES 314, 316
    BUILD RULES LIST
// this rules list is what governs the behavior of the
// server
    FOR ALL SERVER ATTRIBUTES IN CONFIGURATION FILE 314,
    316
```

TABLE 1-continued

*ADMIN Server

```
// server attributes include such things as number of worker
// threads code pages for translations, access and error
// logging if turned on
// additional listener thread 328 if running HTTPs also
      SETUP APPROPRIATE ERROR, LOGGING, ALARM THREADS
      SETUP WORKER THREADS 330
// if all goes well, bind to specified socket and wait
// for work
// usually 2001 for *ADMIN HTTP
// usually 2010 for *ADMIN HTTPs (secure HTTP transactions)
      CONNECT TO SOCKET SPECIFIED IN CONFIG OR OVERRIDE PARMS
      OR SERVICES TABLE
      WAIT IN ACCEPT LOOP FOR BROWSER REQUESTS
      WHEN REQUEST ARRIVES, PASS THE SOCKET DESCRIPTOR TO A
      WORKER THREAD 330
      BACK TO WAIT IN ACCEPT LOOP
// a worker thread that is not busy is selected from the
// pool 330 of worker threads.
// now worker thread has the socket descriptor
      READ HTTP REQUEST FROM SOCKET
      APPLY RULES LIST TO HTTP REQUEST
      IF A MATCH OCCURS
// there may be more than one, but first match wins
         PROCESS RULE WITH "THIS" HTTP REQUEST
// CASE statement as long as number of rules in rules list
// rule is applied to path part of URL
         SELECT RULE
         CASE: PROTECT
            DETERMINE PROTECTION SETUP SUB-DIRECTIVES
            APPLY SUB-DIRECTIVE POLICIES
            CHECK CREDENTIALS AND AUTHENTICATE USER
            IF USER IS AUTHENTICATED
               CONTINUE PROCESSING THROUGH RULES LIST
            ELSE, SEND BACK AUTHENTICATION FAILURE
         CASE: PASS
            LOCATE RESOURCE SPECIFIED IN THE PATH PART OF
            THE URL, GET READY TO SEND RESOURCE
         CASE: FAIL
            GENERATE FORBIDDEN BY RULE MESSAGE
         CASE: EXEC
            LOCATE PROGRAM TO RUN (IN THE URL)
            PREP ENVIRONMENT BY SETTING UP STDIN,
            ENVIRONMENT VARIABLES AND STDOUT
            RUN PROGRAM
            WHEN PROGRAM RETURNS, DATA IS IN STDOUT
         CASE: MAP
            FOR MATCHED ITEM IN TEMPLATE FIELD
               REPLACE MATCHED ITEM WITH REPLACEMENT
               FIELD
         CONTINUE PROCESSING THROUGH RULES LIST
// end of processing through rules list, resource requested
// should be buffered and present, therefore get ready to
// send it to the browser
// must be HTTP like before returning data to browser
// that includes things such as choosing correct MIME types,
// counting output bytes, time of day, server response
// headers
      APPLY THE CORRECT HTTP RESPONSE HEADERS
      RETURN OUTPUT TO BROWSER
      CLOSE THIS CONNECTION
// note, socket options allow the application to close the
// connection without worrying about how much data was sent
// (since this is TCP)
      RETURN THIS THREAD 330 TO WORKER THREAD POOL
   WAIT FOR MORE WORK
// end of pseudo code for Server 310
```

The services table referred to at line 33 is used by many of the components of the IBM AS/400 TCP/IP, and is not shown in the figures. At lines 66–67 reference is made to variables STDIn and STDOUT. These are pathways used by the server to receive or send information from/to the CGI programs, with STDIN to the CGI and STDOUT from the CGI.

Referring to Table 2, a sample instance file 318 is set forth. This sample instance file 318 indicates what configuration files 314, 316 are read and processed in step 324 by *ADMIN server 310. There can be other things in this instance file, and such things would be placed here when the "Instance Parameter" form 420 (FIG. 8) has been correctly filled out. The two files indicated here at lines 2 and 3 would be read and parsed by the *ADMIN server 310 in step 322.

The other flag shown at line 3, -AutoStartN, indicates that this sample server 310 will not Autostart when its TCP/IP stack is invoked. (However, admin server 310 can be autostarted by changing its instance parameter values.) The -r show which configuration file members are being read by the web server for a particular instance (the read-only before the read-write). Line 4 shows that the instance is not autostarted.

TABLE 2

Instance File 318

// Sample of instance file that drives the admin server 310
-r /QSYS.LIB/QTCP.LIB/QATMHTTPI.FILE/DEFAULT.MBR
-r /QSYS.LIB/QUSRSYS.LIB/QATMHTTPA.FILE/ADMIN.MBR -AutoStartN Referring to Table 3, a sample configuration file is presented for controlling the operation of *ADMIN server 310. In this table, a "#" indicates a comment line, and these are not processed by the server. Other lines set forth the directives that get processed into "rules". These rules are then applied on a per request basis to the path portion of the URL.

Following is a description of the functions provided by configuration file 314, including the manner in which to interpret the Enable, Protect, Map, Pass, Exec and AddType commands.

DirAccess (Table 3, line 13)

This directive specifies whether the server is to return directory listings when requested. The values on the Welcome and AlwaysWelcome directives determine when a request is interpreted as a request for a directory listing.

The default value is Off, which means that the server cannot return directory listings for any directories and subdirectories. If it is desired to control which directories and subdirectories the server can return directory listings for, use:

DirAccess Selective

If the value is changed to On, the server will return directory listings.

If the value is changed to Selective, the server will return directory listings for any directory that contains a file named wwwbrws object. The contents of the wwwbrws file are not important, the server only checks for its existence. The object is a member name of an AS/400 physical file or a type of object in an integrated file system directory. For case-sensitive file systems such as /QOpenSys, the wwwbrws name is lower-case.

Examples

DirAccess On

DirAccess Selective

Enable line 15

This directive is used to specify which HTTP methods the server is to accept. As many of the HTTP methods may be enabled as needed. For each method the server is to accept, a separate Enable directive is entered followed by the name of the method.

Example

Enable POST

Protection Table 3 lines 21–31

This directive is used to define a protection setup within the configuration file. The protection setup is given a name and the type of protection is defined using protection subdirectives.

Note

In the configuration file, Protection directives must be placed before any DefProt or Protect directives that point to them.

The format of the directive is:

Protection label-name {
  subdirective value
  subdirective value
  .
  .
  .
} where:

label-name

The name to be associated with this protection setup. The name can then be used by subsequent DefProt and Protect directives to point to this protection setup.

subdirective value

A protection subdirective and its value is placed on each line between the left brace and the right brace. No comment lines may appear between the braces.

See "Protection Subdirectives" for descriptions of the protection subdirectives.

Example:

Protection NAME-ME {
  AuthType Basic
  ServerID restricted
  PasswdFile QUSRSYS/WWW/PASSWORD
  GroupFile/WWW/group.grp
  GetMask groupname
}

Protection Subdirectives

Following are descriptions of each of the protection subdirectives that can be used in a protection setup. The subdirectives are in alphabetical order.

Protection setups are within the configuration file as part of DefProt, Protect, or Protection directives.

A Mask, GetMask, or PostMask subdirective must be specified in the protection setup.

See "Protection example" and the previous descriptions of the DefProt, Protect, and Protection directives for examples of using protection setups.

ACLOverride

Specifies that ACL files override protection setups.1.

This subdirective is used with a value of On if Access Control List files (ACL) is to override the masks specified in the protection setup. If a directory being protected by the protection setup has an ACL file, the mask subdirectives in the protection setup are ignored. (The mask subdirectives are GetMask, Mask, and PostMask.)

See "Using Access Control List (ACL) files" for more information on ACL files.

Example:

ACLOverride On

AuthType

Specifies authentication type.

This subdirective is used to limit access based on user names and passwords. The type of authentication to use when the client sends a password to the server is specified. With basic authentication (AuthType Basic), passwords are sent to the server as plain text. They are encoded, but not encrypted. Only basic authentication is supported.

Example:
    AuthType Basic
    GetMask
    Specifies the user names, groups, and addresses allowed to get files.
    This subdirective is used to specify user names, groups, and address templates authorized to make GET requests to a protected directory. The special value all@(*) will allow all requesters access. See "Rules for specifying user names, group names, and address templates".
Example:
    GetMask authors,(niceguy,goodie)@96.96.3.1, 128.141.*.*
    GroupFile
    Specifies the location of the associated group file.
    This subdirective is used to specify the path and file name of the server group file that this protection setup is to use. The groups defined within the server group file can then be used by:
    1. Any mask subdirectives that are part of the protection setup. (The mask subdirectives are GetMask, Mask, and PostMask.)
    2. Any ACL file on a directory that is protected by the protection setup.
    See "Using server group files" more information about server group files.
Example:
    GroupFile /docs/etc/WWW/restrict.grp
    Mask
    Specifies the user names, groups, and addresses allowed to make HTTP requests.
    This subdirective is used to specify user names, groups, and address templates authorized to make HTTP requests not covered by other mask subdirectives. The special value all@(*) will allow all requesters access. See "Rules for specifying user names, group names, and address templates". See "Methods—Set method acceptance" for descriptions of the HTTP methods supported by the server.
Note:
    Masks are case sensitive. The following is an example of how Mask protection is issued on a user ID:
Example:
    MASK WEBADM,webadm
    PasswdFile
    Specifies the location of the associated validation list.
    This subdirective is used when limiting access based on user names and passwords. The PasswdFile directive may be issued by one of the following methods:
    1. Specify the path name of the validation list that this protection setup is to use:
        libname/validation_list_name
    2. Specify %%SYSTEM%% to indicate that the AS/400 user profiles are to be used to validate user names and passwords.
Examples:
PasswdFile %%SYSTEM%%
PasswdFile QUSRSYS/HEROES
    In the above example, note that %%SYSTEM%% lets the server know that password verification is done with an AS/400 user profile.
    PostMask
    Specifies the user names, groups, and addresses allowed to post files.
    For a secure server, this subdirective is used to specify users, groups, and address templates authorized to make POST requests to a protected directory. The special value all@(*) will allow all requesters access. See "Rules for specifying user names, group names, and address templates".
Example:
    PostMask Anyone@9.136.*
    ServerID
    Specifies a name to associate with the validation list.
    This subdirective is used when limiting access based on user names and passwords. A name to associate with the validation list being used is specified. The name does not need to be a real machine name.
    The name is used as an identifier to the requester. Since different protection setups can use different validation lists, having a name associated with the protection setup can help the client decide which password to send. This name may be displayed when prompting for a user name and password.
Example:
    ServerID restricted
    UserID
    Specifies the Access Control user ID that the server should use.
    This subdirective is used to specify the AS/400 user profile that the server switches to while completing the HTTP transaction.
    %%SYSTEM%% is specified to use the profile of the server, default QTMHHTTP.
    %%CLIENT%% is specified to use the user profile that was supplied when challenged for user ID and password.
    The values specified here (on the UserId Protection subdirective) override the values specified on the UserId directive.
Example
    UserID WWW
Protect Table 3 line 37
    This directive is used to activate protection setup rules for requests that match a template.
    For protection to work properly, DefProt and Protect directives must be placed before any Pass or Exec directives in the configuration file.
    The format of the directive is different depending upon whether it is to point to a label containing the protection subdirectives or to include the protection subdirectives as part of the Protect directive.
    1. To point to a label containing the protection subdirectives, the format is as follows:
Protect request-template [label [FOR IP-address-template]]]
    2. To include the protection subdirectives as part of the Protect directive, the format is as follows:
    Protect request-template [IP-address-template]]{
        subdirective value
        subdirective value
        .
        .
        .
    }
where:
    request-template
    A template for requests for which protection is to be activated. The server compares incoming client requests to the template and activates protection if there is a match.
    label
    This parameter is used to identify the protection setup containing the protection subdirectives to activate for requests that match request-template.
    This parameter is optional. If it is omitted, the protection setup is defined by the most recent DefProt directive that contains a matching template.

Protection setup is defined with protection subdirectives. See "Protection Subdirectives" for descriptions of the protection subdirectives.

A protection setup label name that matches a name defined earlier on a Protection directive. The Protection directive contains the protection subdirectives.

subdirective value

A parameter used to include the protection subdirectives as part of the Protect directive. The left brace character must be the last character on the same line as the Protect directive. Each subdirective follows on its own line. The right brace character must be on its own line following the last subdirective line.

No comment lines may be placed between the braces.

See "Protection Subdirectives" for descriptions of the protection subdirectives.

FOR IP-address-template

If the server has multiple connections, this parameter can be used to specify an address template. The server uses the directive only for requests that come to the server on a connection with an address matching the template. It is the address of the server's connection that is compared to the template, not the address of the requesting client.

A complete IP address may be specified (for example, 204.146.167.72) Or, an asterisk can be used as a wildcard character to specify a template (for example, 9.99.*).

This parameter is optional. Without this parameter, the server uses the directive for all requests regardless of the connection the requests come in on.

To use this parameter, the label or subdirective value parameters must also be used.

Examples:
UserID ANYBODY
Protection DEF-PROT {
UserID BUSYBODY
AuthType Basic
ServerID restricted
PasswdFile QUSRSYS1/WWW/restrict
GroupFile /docs/WWW/restrict.grp
GetMask authors
}
Protect /secret/business/* DEF-PROT
Protect /topsecret/* {
AuthType Basic
ServerID restricted
PasswdFile QUSRSYS/TOPBRASS
GroupFile /docs/WWW/restrict.grp
GetMask topbrass
}
Pass /secret/scoop/* /WWW/restricted/*
Pass /secret/business/* /WWW/confidential/*
Pass /topsecret/* /WWW/topsecret/*

In the above example, the server would activate protection as follows:
1. Since the Protect directive does not specify a protection setup, the protection setup on the previously matching DefProt directive is used. Also, the server changes to the user profile of webname as defined on the DefProt directive.
2. Requests beginning with /secret/business/ activate protection. The protection setup is defined on the Protection directive that has a label of DEF-PROT. Also, the server changes to the user profile of busybody as defined in the DEF-PROT protection setup.
3. Requests beginning with /topsecret/ activate protection. The protection setup is included directly on the Protect directive. The user profile defaults to ANYBODY. (ANYBODY comes from the UserId directive at the beginning of the example.)

Note: The user profile ANYBODY must exist and the server much have authority to use it.

Examples:
Protect /secret/* CustomerA-PROT webname 204.146.167.72
Protect /secret/* CustomerB-PROT webname 9.67.*
Protect /topsecret/* webname 204.146.167.72 {
AuthType Basic
ServerID restricted
PasswdFile QUSRSYS/WWW/CUSTOMERA
GroupFile /docs/WWW/customer-A.grp
GetMask A-brass
}
Protect /topsecret/* webname 9.67.* {
AuthType Basic
ServerID restricted
PasswdFile QUSRSYS/WWW/CUSTOMERB
GroupFile /docs/WWW/customer-B.grp
GetMask B-brass
}

The above examples use the optional IP address template parameter. If the server receives requests that begin with /secret/ or /topsecret/, it activates a different protection setup for the request based on the IP address of the connection the request comes in on.

For /secret/ requests coming in on 204.146.167.72, the server activates the protection setup defined on a Protection directive with a label of CustomerA-PROT. For /topsecret/ requests coming in on 204.146.167.72, the server activates the protection setup defined inline on the first Protect directive for /topsecret/.

For /secret/ requests coming in on any connection with an address beginning 9.67, the server activates the protection setup defined on a Protection directive with a label of CustomerB-PROT. For /topsecret/ requests coming in on any connection with an address beginning 9.67, the server activates the protection setup defined inline on the second Protect directive for /topsecret/.

Map Table 3 line 49

This directive is used to specify a template for requests change to a new request string. After the server changes the request, it takes the new request string and compares it to the request templates on subsequent directives.

The format of the directive is:

Map request-template new-request [IP-address-template]

where:

request-template

A template for requests that the server is to change and then continue comparing the new request string to other templates.

An asterisk may be used as a wildcard in the template.

new-request

The new request string the server is to continue to compare to the request templates on subsequent directives. new-request may contain a wildcard if the request-template has one. The part of the request that matches the request-template wildcard is inserted in place of the wildcard in new-request.

IP-address-template

If the server has multiple connections, this parameter can be used to specify an address template. The server uses the directive only for requests that come to the server on a connection with an address matching the template. It is the address of the server's connection that is compared to the template, not the address of the requesting client.

A complete IP address may be specified (for example, 204.146.167.72). Or, an asterisk may be used as a wildcard character and a template specified (for example, 9.99.*).

This parameter is optional. Without this parameter, the server uses the directive for all requests regardless of the connection the requests come in on.

Examples:

Example for a Map request with /cgi-bin/ as a PGM object:

Map /cgi-bin/* /cgi-bin/*.pgm
Exec /cgi-bin/*.pgm /qsys.lib/cgilib.lib/*

In the above example, the server would take any requests starting with /cgi-bin/ and change the /cgi-bin/ portion of the request to /cgi-bin/*.pgm. Anything that followed /cgi-bin/ on the original request would also be included in the new request string. So /cgi-bin/whatsup/ would change to /cgi-bin/whatsup.pgm.

The Exec directive would change the /cgi-bin/whatsup.pgm to /qsys.lib/cgilib.lib/*. This change allows the Internet Connection Secure Server to execute the program cgipgm in library cgilib. The server would take the new request string and continue to compare it to request templates on subsequent directives.

Map /stuff/* /customerA/good/stuff/* 204.146.167.72
Map /stuff/* /customerB/good/stuff/* 9.99.*

The above examples use the optional IP address template parameter. If the server receives requests that begin with /stuff/, it changes the request to a different request string based on the IP address of the connection the request comes in on. For requests coming in on 204.146.167.72 the server changes the /stuff/ portion of the request to /customerA/good/stuff/. For requests coming in on any connection with an address beginning 9.99, the server changes the /stuff/ portion of the request to /customerB/good/stuff/.

Pass Table 3 line 76

This directive is used to specify a template for requests to be accepted and responded to with a document from the server. Once a request matches a template on a Pass directive, the request is not compared to request templates on any subsequent directives.

The format of the directive is:

Pass request-template [file-path IP-address-template]]

where:

request-template

A template for requests the server is to accept and respond to with a document from the server.

An asterisk can be used as a wildcard in the template.

file-path

The path to the file that contains the document the server is to return. file-path may contain a wildcard if the request-template has one. The part of the request that matches the request-template wildcard is inserted in place of the wildcard in file-path.

This parameter is optional. If a path is not specified, the request itself is used as the path.

IP-address-template

If the server has multiple connections, this parameter can be used to specify an address template. The server uses the directive only for requests that come to the server on a connection with an address matching the template. It is the address of the server's connection that is compared to the template, not the address of the requesting client.

A complete IP address may be specified (for example, 204.146.167.72). Or, an asterisk can be used as a wildcard character and a template specified (for example, 9.99.*).

This parameter is optional. To use this parameter, the file-path parameter must also be used. Without the IP-address-template parameter, the server uses the directive for all requests regardless of the connection the requests come in on.

Examples:

| QDLS: | Pass | /doc/* | /QDLS/WEBTEST/*.HTM |
|---|---|---|---|
| Root: | Pass | /root/* | /WEBSAMP/*.html |
| QOpenSys: | Pass | /x/* | /QOpenSys/WEBSAMP/*.html |
| QSYS: | Pass | /lib/* | /QSYS.LIB/WEBSAMP.LIB/HTMLDOC.FILE/*.MBR |

Specifying Pass with /* as a template and no replacement string allows the server to serve any AS/400 file that QTMHHTTP user profile has read access to, with a request that specifies the AS/400 real document name; for example, /QSYS.LIB/PERSONAL.LIB/DATA.FILE/PAY.MBR. A Pass directive with /* as a template can be used to refer to a replacement string that would serve an AS/400 document; for example, Pass /* /www/webdata/web.html. This would be used after all other Map, Pass, Exec, and Redirect directives to prevent anyone from getting an Error 403 "Forbidden by rule".

In the above example for the QDLS file system, the server would respond to a request starting /doc/ with a document from /QDLS/WEBTEST/. Anything that followed /doc/ would also be used to identify the document. So the server would respond to the request /doc/test/test1/doctest.html with the document in file /QDLS/WEBTEST/test/test1/doctest.html.

Pass /gooddoc/*

In the above example, the server would respond to a request starting with /gooddoc/ with a document from /gooddoc. So the server would respond to the request /gooddoc/volume1/issue2/newsletter4.html with the document in file /gooddoc/volume1/issue2/newsletter4.html.

| Pass | /parts/* | /customerA/catalog/* | 204.146.167.72 |
|---|---|---|---|
| Pass | /parts/* | /customerB/catalog/* | 9.99.* |

The above examples use the optional IP address template parameter. If the server receives requests that begin with /parts/, it returns a file from a different directory based on the IP address of the connection on which the request is received. For requests coming in on 204.146.167.72 the server returns a file from /customerA/catalog/. For requests coming in on any connection with an address beginning 9.99, the server returns a file from /customerB/catalog/.

Exec Table 3 line 126

This directive is used to specify a template for requests to be accept and responded to by running a CGI program. Once a request matches a template on an Exec directive, the request is not compared to request templates on any subsequent directives.

The format of the directive is:

Exec request-template program-path [IP-address-template]

where:

request-template

A template for requests that server is to accept and respond to by running a CGI program.

An asterisk must be used as a wildcard in the program-path. The part of the request that matches the request-template wildcard must begin with the name of the file that contains the CGI program. The request-template is case sensitive, but the replacement string is only case sensitive when it refers to a case sensitive file system.
Example

```
Map /cgi-bin/* /cgi-bin/*.pgm
Exec /cgi-bin/* /qsys.lib/cgilib.lib/*
```

This example substitutes the value after /cgi-bin/ as the name of the program. The Exec directive identifies the library where the CGI program specified in /cgi-bin/ is stored. The Exec directive changes the directive to the cgilib library.
  program-path
  The path to the file that contains the CGI program that the server is to execute for the request.
  CGI programs can be run from the QSYS file system, only.
  program-path must also contain a wildcard. The wildcard is replaced with the name of the file that contains the CGI program. The request can also contain additional data that is passed to the CGI program in the PATH_INFO environment variable. The additional data follows the first slash character that comes after the CGI program file name on the request. The data is passed according to CGI specifications.
  IP-address-template
  If the server has multiple connections, this parameter is used to specify an address template. The server uses the directive only for requests that come to the server on a connection with an address matching the template. It is the address of the server's connection that is compared to the template, not the address of the requesting client.
  A complete IP address may be specified (for example, 204.146.167.72). Or, an asterisk may be used as a wildcard character and a template specified (for example, 9.99.*).
  This parameter is optional. Without this parameter, the server uses the directive for all requests regardless of the connection the requests come in on.
Example

```
Map    /cgi-bin/*    /cgi-bin/*.pgm
Exec   /cgi-bin/*    /QSYS.LIB/CGIBIN.LIB/*
```

In the above example, the server expects to find the CGI program in library CGIBIN. In this case, the request for http://hostname/cgi-bin/mycgi causes the server to attempt to run the program named MYCGI, in library CGIBIN. The Map directive adds the .pgm to the program name so .pgm does not have to be specified on the URL request. The request arrives at the server as:

```
/cgi-bin/mycgi              The request arrives.
/cgi-bin/mycgi.pgm          The Map directive adds the .pgm.
/QSYS.LIB/CGIBIN.LIB/*      The request changes to identify
                            the path to the program (As/400
                            library.)
```

AddType Table 3 line 132
  This directive is used to bind files with a particular extension to a MIME type/subtype. Multiple occurrences of this directive may be used in the configuration file. The format of the directive is:

AddType extension type/subtype encoding [quality]
where:
  .extension
  The file extension pattern. The wildcard character (*) may be used only on the following two special extension patterns:
  *.*
  Matches all file names that contain a dot character (.) and have not been matched by other rules
  *
  Matches all file names that do not contain a dot character (.) and have not been matched by other rules
  type/subtype
  The MIME type and subtype to bind to files that match the corresponding extension pattern.
  encoding
  The MIME content encoding to which the data has been converted:
  7 bit
  Data is all represented as short (less than 1000 characters) lines of US-ASCII data. Source code or plain text files usually fall into this category. Exceptions would be files containing line-drawing characters or accented characters.
  8 bit
  Data is represented as short lines, but may contain characters with the high bit set (for example, line-drawing characters or accented characters). PostScript files and text files from European sites usually fall into this category.
  binary
  This encoding can be used for all data types. Data may contain not only non-ASCII characters, but also long (greater than 1000 characters) lines. Almost every file of type image/*, audio/*, and video/* falls into this category, as do binary data files of type application/*.
  quality
  An optional indicator of relative value (on a scale of 0.0 to 1.0) for the content type. The quality value is used if multiple representations of a file are matched by a request. The server selects the file that is associated with the highest quality value. For example, if the file internet.ps is requested, and the server has the following AddType directives:

```
AddType   .ps application/postscript   8bit      1.0
AddType   *.* application/binary       binary    0.3
``` the server would use the application/postscript line because its quality number is higher.
Example:
  AddType.bin application/octet-stream binary 0.8

TABLE 3

Configuration File 314

| | |
|---|---|
| # start sample of configuration file that drives #ADMIN | # |
| # server 310 | # |
| # * * * * * * * * * * * * * * * * * * * * * * * * * * * | # |
| # | # |
| # HTTP Administration server configuration | # |
| # | # |
| # * * * * * * * * * * * * * * * * * * * * * * * * * * * | # |
| # | # |
| # HostName                         your.full.host.name | # |
| # The default ports for the adminstration server are set | |

TABLE 3-continued

Configuration File 314

```
# in the services table.
#                                                              #
    DirAccess                        Off
#                                                              #
# ENABLE start                                                 #
    Enable                           POST
    Enable                           GET
    Enable                           HEAD
# ENABLE end                                                   #
#                                                              #
# PROTECTION start - Force authentication and treat as         #
# AS/400 *USRPRF                                               #
    Protection      IBMDFTP  {
    AuthType        Basic
    ServerID        OS400ADM
    UserId          %%CLIENT%%
    PasswdFile      %%SYSTEM%%
    GetMask         All
    PostMask        All
    }
# PROTECTION end                                               #
#                                                              #
# PROTECT start                                                #
    Protect     /QIBM/Firewall/*              IBMDFTP
    Protect     /QIBM/NetC/*                  IBMDFTP
    Protect     /                             IBMDFTP
    Protect     /AS400TASKS                   IBMDFTP
    Protect     /QIBM/OS400/*                 IBMDFTP
    Protect     /QIBM/ICS/HTML/*              IBMDFTP
    Protect     /QSYS.LIB/QSYSCGI.LIB/*       IBMDFTP
    Protect     /QSYS.LIB/QTCPCGI.LIB/*       IBMDFTP
    Protect     /QIBM/ICSS/Cert/*             IBMDFTP
# PROTECT end                                                  #
#                                                              #
# MAP start                                                    #
    Map /QIBM/Firewall/Admin/*
/QSYS.LIB/QSYSCGI.LIB/DB2WWW.PGM/QIBM
        /ProdData/HTTP/Protect/Firewall/Macro/*
    Map /QIBM/NetC/Admin/QSYS.LIB/QSYSCGI.LIB
        /WEBCONFIG.PGM/loadmlt
    Map /QIBM/NetC/Admin/webconfig/*
/QSYS.LIB/QSYSCGI.LIB/WEBCONFIG.PGM/*
    Map /QIBM/NetworkStation/Admin /QYTC/QYTCMAIN.PGM
    Map /QIBM/ICSS/Cert/Admin/*
/QSYS.LIB/QSYSCGI.LIB/DB2WWW.PGM
        /QIBM/ProdData/HTTP/Protect/ICSS/Cert/Macro/*
    Map /
        /QSYS.LIB/QSYSCGI.LIB/DB2WWW.PGM
        /QIBM/ProdData/HTTP/Protect
        /OS400/Macro/qyunmain.ndm/main0
    Map /AS400TASKS /QSYS.LIB/QSYSCGI.LIB/DB2WWW.PGM
        /QIBM/ProdData/HTTP/Protect/OS400/Macro
        /qyunmain.ndm/main0
    Map /QIBM/ICS/HTML/MRI2924/rzaglmst.html
/QSYS.LIB/QTCPCGI.LIB/QTMHFMIN.PGM/QUICKBGN
    Map /QIBM/ICS/HTML/MRI2924/sample.html
/QSYS.LIB/QTCPCGI.LIB/QTMHFMIN.PGM/SAMPLE
    Map /QIBM/ICS/HTML/MRI2924/icswgmst.html
/QSYS.LIB/QTCPCGI.LIB/QTMHFMIN.PGM/WEBMSTGD
# MAP end                                                      #
#                                                              #
# PASS start                                                   #
    Pass /QIBM/OS400/*
/QIBM/ProdData/HTTP/Protect/OS400/HTML/*
    Pass /QIBM/Firewall/*
/QIBM/ProdData/HTTP/Protect/Firewall/HTML/*
    Pass /QIBM/NetC/*
        /QIBM/ProdData/HTTP/Protect/NetC/*
    Pass /QIBM/NetworkStation/*
/QIBM/ProdData/HTTP/Protect/NetworkStation/*

# Pass statements for misplaced GIF files

    Pass /QIBM/ICS/HTML/MRI*/docmast.*
        /QIBM/ProdData/HTTP/Protect/TC1/ICSS
        /HTML/ICONS/docmast.gif
    Pass /QIBM/ICS/HTML/MRI*/ics10s03.*
        /QIBM/ProdData/HTTP/Protect/TC1/ICSS
        /HTML/ICONS/ics10s03.gif
    Pass /QIBM/ICS/HTML/MRI*/ics10s04.*
        /QIBM/ProdData/HTTP/Protect/TC1/ICSS
        /HTML/ICONS/ics10s04.gif
    Pass /QIBM/ICS/HTML/MRI*/ics10s05.*
        /QIBM/ProdData/HTTP/Protect/TC1/ICSS
        /HTML/ICONS/ics10s05.gif
    Pass /QIBM/ICS/HTML/MRI*/ics10s06.*
        /QIBM/ProdData/HTTP/Protect/TC1/ICSS
        /HTML/ICONS/ics10s06.gif
    Pass /QIBM/ICS/HTML/MRI*/ics10s07.*
        /QIBM/ProdData/HTTP/Protect/TC1/ICSS
        /HTML/ICONS/ics10s07.gif
    Pass /QIBM/ICS/HTML/MRI*/ics10s08.*
        /QIBM/ProdData/HTTP/Protect/TC1/ICSS
        /HTML/ICONS/ics10s08.gif
    Pass /QIBM/ICS/HTML/MRI*/ics10s14.*
        /QIBM/ProdData/HTTP/Protect/TC1/ICSS
        /HTML/ICONS/ics10s14.gif
    Pass /QIBM/ICS/HTML/MRI*/ICFICON.*
        /QIBM/ProdData/HTTP/Protect/TC1/ICSS
        /HTML/ICONS/icficon.gif

    Pass /QIBM/ICS/HTML/*
/QIBM/ProdData/HTTP/Protect/TC1/ICSS/HTML/*
        Pass /QIBM/ProdData/HTTP/Public/*
        Pass /QIBM/ICSS/Cert/Download/*
    /QIBM/UserData/ICSS/Cert/Download/*
        Pass /QIBM/ICSS/Cert/*
/QIBM/ProdData/HTTP/Protect/ICSS/Cert/HTML/*
# PASS end                                                     #
#                                                              #
# EXEC start                                                   #
    Exec /QSYS.LIB/QSYSCGI.LIB/*
    Exec /QSYS.LIB/QTCPCGI.LIB/*
    Exec /QYTC/*  /QSYS.LIB/QYTC.LIB/*
# EXEC end                                                     #
#                                                              #
# AddType start                                                #
    AddType .cacrt     application/x-x509-ca-cert      7bit 1.0
    AddType .usrcrt    application/x-x509-user-cert    7bit 1.0
    AddType .CACRT     application/x-x509-ca-cert      7bit 1.0
    AddType .USRCRT    application/x-x509-user-cert    7bit 1.0
# AddType end                                                  #
# * * * * * * * * * * * * * * * * * * * * * * * * * * * * *    #
# end Sample of configuration file that drives the admin
# server
```

Figure 6:
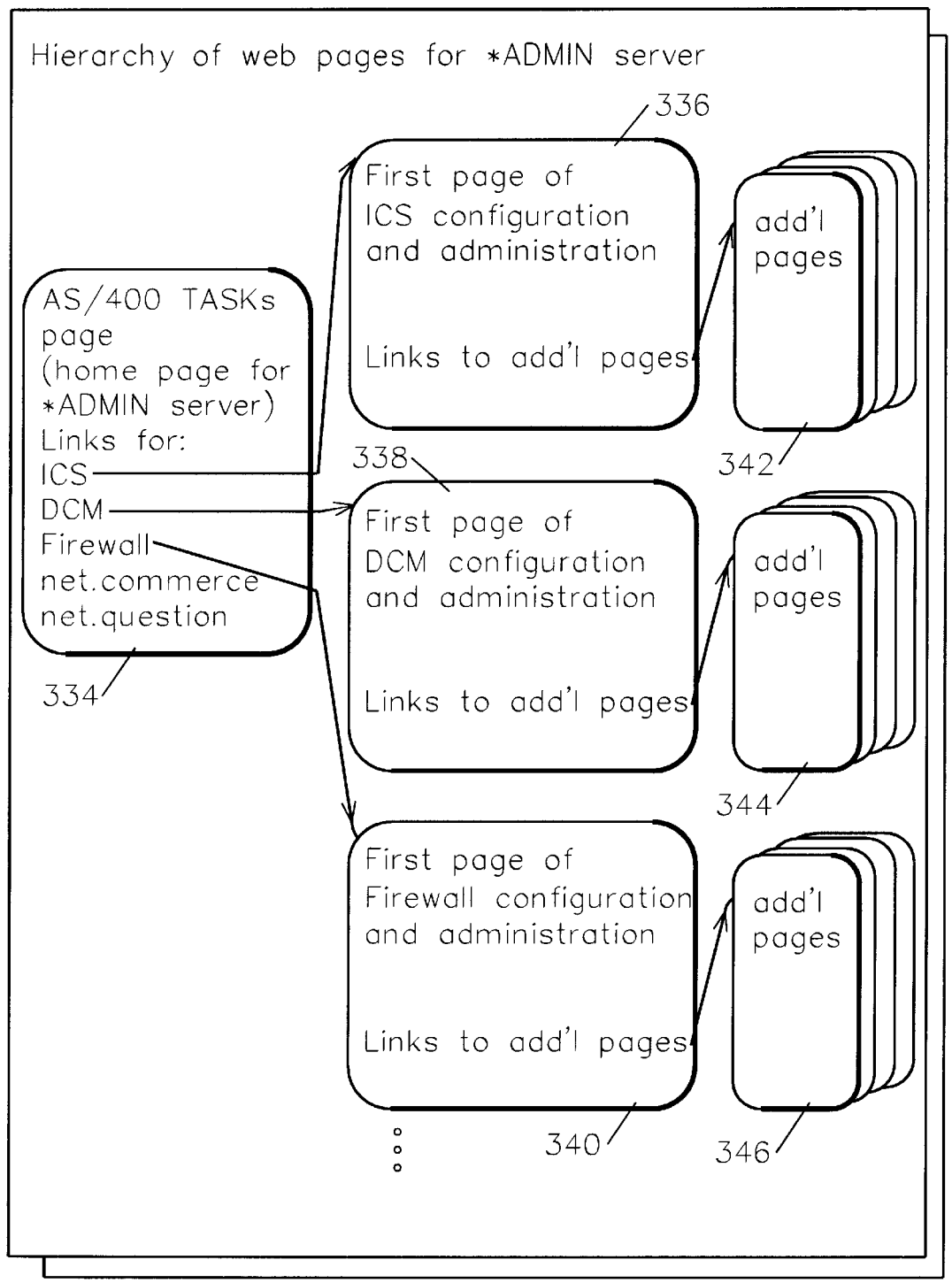
FIG. 6 is a flow diagram of the *ADMIN site of the preferred embodiment of the invention.

Referring to FIG. 6, the hierarchy of web pages for *ADMIN server 310 is set forth. Tasks page 334 is the home page for *ADMIN server 310, and provides links to first page 336 of ICS configuration and administration, first page 338 of DCM configuration and administration, and first page 340 of firewall configuration and administration. Each of pages 336, 338 and 340 provide links to additional pages 342, 344 and 346, respectively.

Referring to FIG. 7, a specific example 350 of task page 334 is shown. Task page 334 includes buttons for accessing additional pages, including button 352 which when activated will bring up an Internet connection server for configuring an HTTP server and SSL; button 354 which when activated will bring up a page for setting up and monitoring an Internet firewall; button 356 which when activated will bring up a page for configuring a net commerce server; and button 358 which when activated will bring up a page for creating, distributing and managing digital certificates.

The purpose of tasks page 350 is to provide a single URL or collection point for all those applications or system components that use the web browser for configuration and administration. As shown here, four applications 352, 354, 356 and 358 appear on tasks page 350.

Referring to Table 4, an HTML representation of a specific example of an AS/400 TASKS page 350 is set forth.

TABLE 4

Tasks Page 150 (HTML)

```
<HTML>
<HEAD>
<TITLE>AS/400 Tasks</TITLE>
<P>
<SCRIPT LANGUAGE="JavaScript">
<!--
    function showHelpFunction() {
window.open("/QSYS.LIB/QSYSCGI.LIB/DB2WWW.PGM/QIBM/ProdData/HTTP/
Protect/OS400/Macro/qyunmain.ndm/help0","",
"width=600,height=400,menubar=yes,scrollbars=yes,resizable=yes,st
atus")}
//-->
</SCRIPT>
</HEAD>
<BODY BGCOLOR="#FFFFFF" >
<CENTER>
<TABLE WIDTH=80%>
<TR>
<TD>
<FONT SIZE=5>
<STRONG>
<IMG SRC="/QIBM/OS400/Icons/ibmlogo.gif" ALIGN=LEFT ALT="IBM">
</STRONG>
</FONT>
</td>
<TD rowspan=2>
<CENTER>
<FONT SIZE=6>
<STRONG>AS/400 Tasks
</STRONG>
</FONT>
</CENTER>
<TD ALIGN=CENTER>
<IMG SRC="/QIBM/OS400/Icons/as400.gif" ALT="">
</TD>
</TR>
<TR>
<td>
<FONT Size=1>(C) IBM Corporation 1997
</FONT>
</TD>
<td>
<center>
<FONT Size=2>RS008.ENDICOTT.IBM.COM
</FONT>
</center>
</td>
</TR>
<TR>
<TD colspan=3>
<HR size=1>
</td>
</TR>
<TR>
<td colspan=3>
<P>
<BR>
<CENTER>
<TABLE>
<TR>
<TD>
<A HREF="/QSYS.LIB/QTCPCGI.LIB/QTMHICFP.PGM">
<IMG SRC="/QIBM/ICS/HTML/ICONS/anchgrap.gif" border="0" ALT"*">
</A>
</TD>
<TD>
<A HREF="/QSYS.LIB/QTCPCGI.LIB/QTMHICFP.PGM">
<STRONG>Internet Connection Server for AS/400
</STRONG>
</A>
<BR>
<FONT SIZE=2>Configure the AS/400 HTTP Server and SSL
</FONT>
```

TABLE 4-continued

Tasks Page 150 (HTML)

```
</TD>
</TR>
<TR>
<TD>
<A HREF="/QIBM/Firewall/Admin/qisafwl.ndm/main0">
<IMG SRC="/QIBM/Firewall/Icons/qisafwl.gif" border="0" ALT"*">
</A>
</TD>
<TD>
<A HREF="/QIBM/Firewall/Admin/qisafwl.ndm/main0">
<STRONG>IBM Firewall for AS/400
</STRONG>
</A>
<BR>
<FONT SIZE=2>Set up and monitor an Internet Firewall
</FONT>
</TD>
</TR>
<TR>
<TD>
<A HREF="/QIBM/NetC/Admin">
<IMG SRC="/QIBM/NetC/Server/Icons/netcomm.gif" border="0"
ALT="*">
</A>
</TD>
<TD>
<A HREF="/QIBM/NetC/Admin">
<STRONG>IBM Net.Commerce for AS/400
</STRONG>
</A>
<BR>
<FONT SIZE=2>Configure the Net.Commerce Server
</FONT>
</TD>
</TR>
<TR>
<TD>
<A HREF="/QIBM/ICSS/Cert/Admin/qycucml.ndm/main0">
<IMG SRC="/QIBM/ICSS/Cert/Icons/qycucm1.gif" border="0" ALT="*">
</A>
</TD>
<TD>
<A HREF="/QIBM/ICSS/Cert/Admin/qycucml.ndm/main0">
<STRONG>Digital Certificate Manager
</STRONG>
</A>
<BR>
<FONT SIZE=2>Create, distribute, and manage Digital Certificates
</FONT>
</TD>
</TR>
</TABLE>
</CENTER>
<P><BR>
</td>
</TR>
<TR>
<td>
<A href="http://www.as400.ibm.com/anchor/MRI2924/anchhome.htm">
<font size="-1">Related task information
</font>
</a>
</td>
<td>
</td>
<td>
<center>
<a href="Javascript:showHelpFunction()">
<img src="/QIBM/OS400/Icons/help.gif" border="0" alt="">
<BR>Help
</a>
<BR>
<font size="-2">(Requires JavaScript)
</font>
</center>
</td>
</TR>
```

TABLE 4-continued

Tasks Page 150 (HTML)

```
</TABLE>
</center>
</BODY>
</HTML>
```

Figure 8:
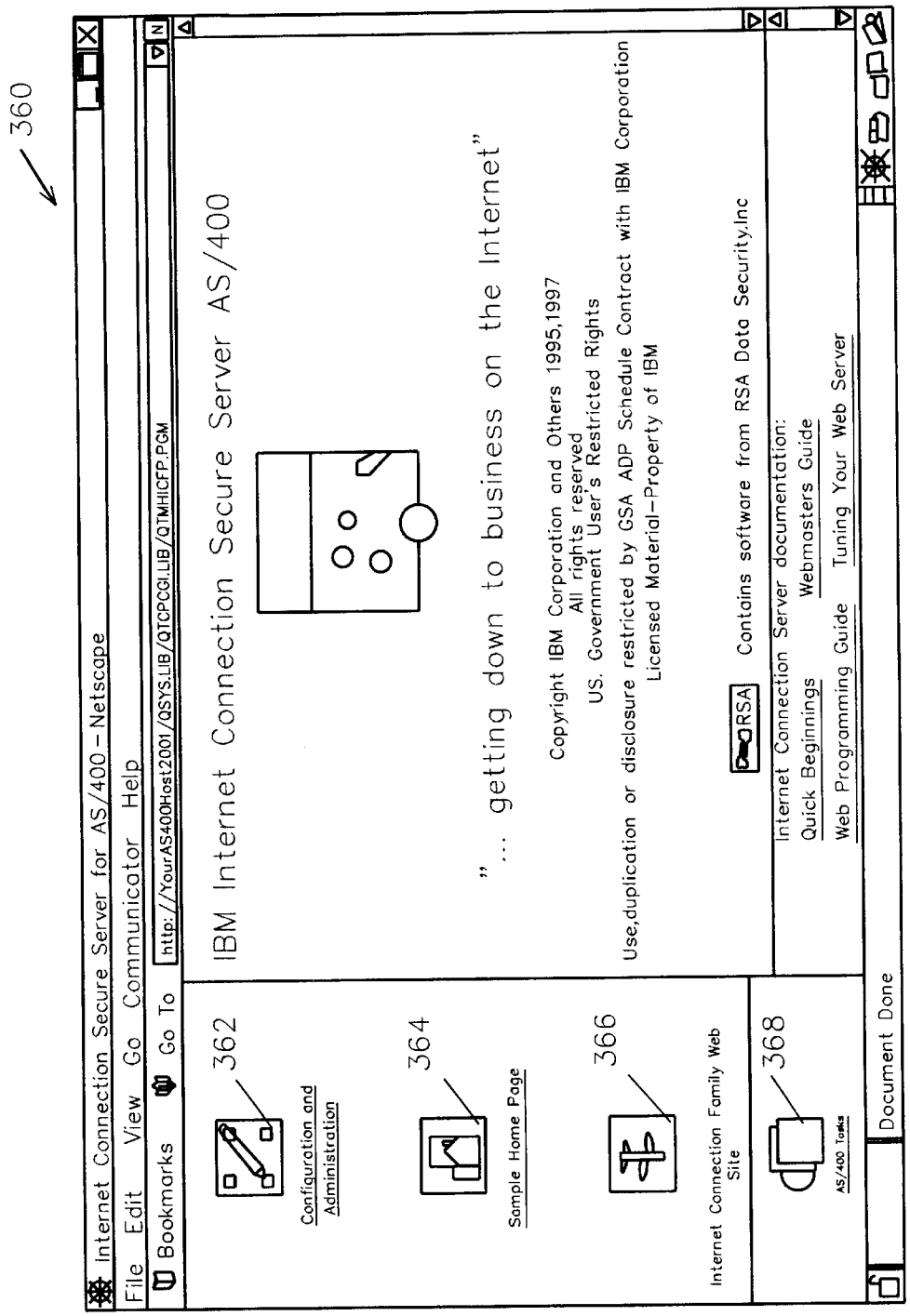
FIG. 8 is a diagram illustrating the front page, or first page for configuration and administration of ICS in accordance with a preferred embodiment of the invention.

Referring to FIG. 8, a sample representation of first page 360 of ICS configuration and administration 336 is shown. This is brought up at browser 304 by selecting the Internet Connection Server for AS/400 link 352 on tasks page 350. Internet connection secure server 360 includes buttons 362 for selecting configuration and administration, 364 for selecting a sample home page, 366 for selecting Internet connection family web site, and 368 for selecting AS/400 tasks.

Referring to Table 5, an HTML representation for page 360 is set forth. This first page 360 is also referred to as the front page. Tables 5–9 are created by the CGI scripts.

TABLE 5

Front Page (HTML)

```
Sample HTML representation of First Page of ICS
configuration and Administration
<html>
<head>
<title>Internet Connection Secure Server for AS/400</title>
</head>
<frameset COLS="25,75">
<frame SRC="/QIBM/ICS/HTML/MRI2924/TCSNAV.HTML"
NAME="ICSNavFrame">
<frameset ROWS="78,22">
<frame SRC="/QIBM/ICS/HTML/MRI2924/TCSSLOGO.HTML"
NAME="ICSLogoFrame">
<frame SRC="/QIBM/ICS/HTML/MRI2924/ICSBUTN.HTML"
NAME="ICSButtonsFrame">
</frameset>
</frameset>
```

TABLE 5-continued

Front Page (HTML)

```
<form NAME="icsframe" ACTION="" METHOD="POST">
<center>
</form>
</center>
</body>
</html>
```

Figure 10:
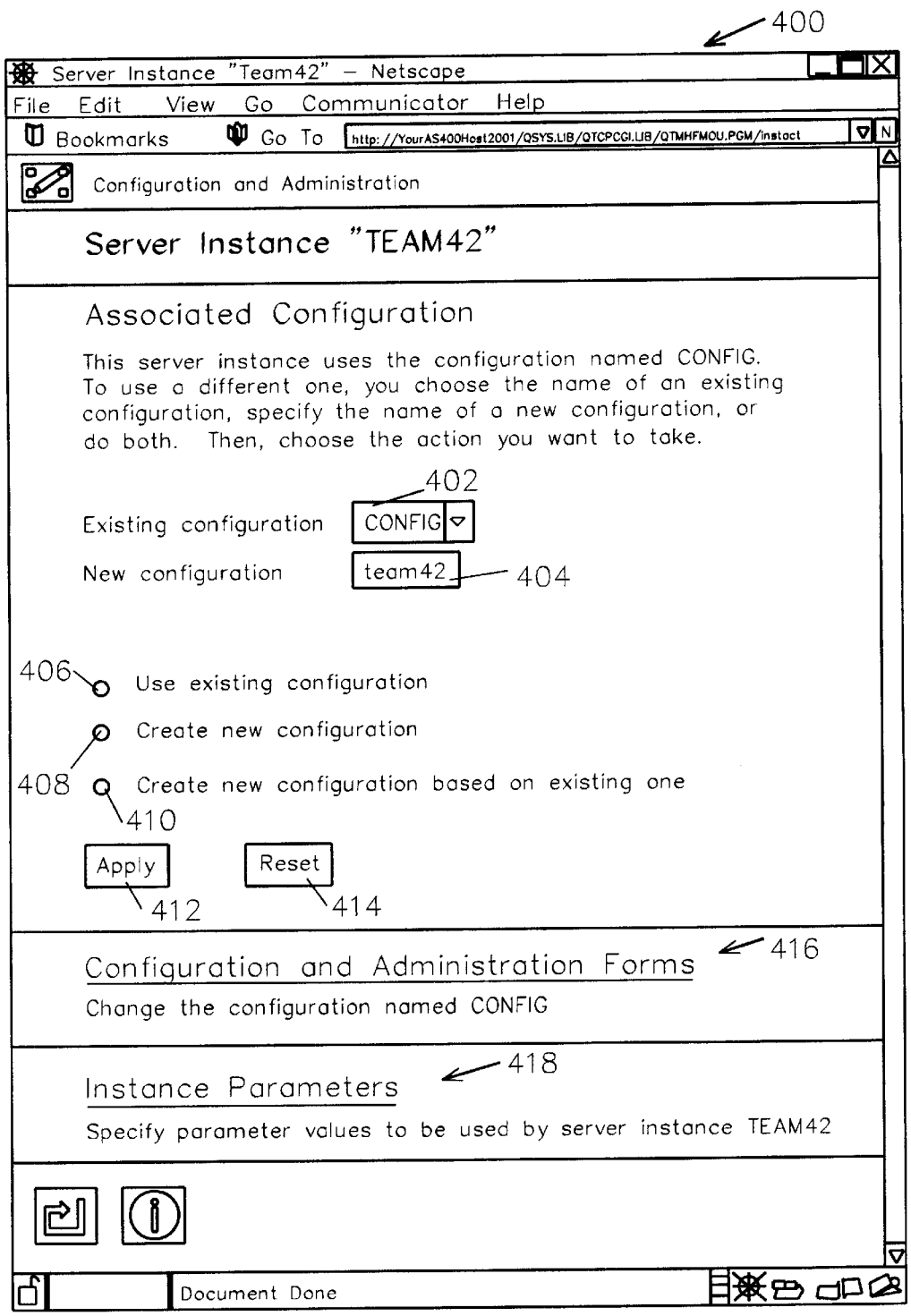
FIG. 10 is a diagram illustrating a server instance page in accordance with the preferred embodiment of the invention.

Referring to FIG. 9, a representation of link configuration and administration page 370 is illustrated. This is a specific example of a page selected by choosing configuration and administration button 362 from page 360 (FIG. 5). This page 370 may be used to add a new ICS server instance, or manage an existing one. To add a new server instance, an instance name is entered in field 386 and add button 388 activated. To manage an existing server instance, the server is chosen by activating ADMIN radio button 372 or DEFAULT radio button 374, and the action then selected and initiated by activating change button 376, delete button 378, start button 380, stop button 382, or restart button 384. The Delete, Start, Stop and Restart functions perform that action and indicate back the results. Selecting change button 376 brings up panel 400 (FIG. 10). The global attribute values may be changed by selecting field 390.

Referring to Table 6, the HTML code used to generate page 370 is set forth.

TABLE 6

General Configuration and Administration (HTML)

```
// Sample HTML representation of Configuration and
// Administration
<html>
<head>
<title>General Configuration and Administration</title>
</head>
<img src="/QIBM/ICS/HTML/ICONS/skycfg2.gif" align="middle">
<strong>Configuration and Administration
</strong>
<p><hr>
<body>
<br>
<h1>General Configuration and Administration</h1>
<hr>Choose an existing server instance and an action to
perform on it.
<br>
<form ACTION="/QSYS.LIB/QTCPCGI.LIB/QTMHFMOU.PGM/instact"
METHOD="POST">
<INPUT TYPE=RADIO NAME="INSTANCE" VALUE="ADMIN"> ADMIN
<BR>
<INPUT TYPE=RADIO NAME="INSTANCE" VALUE="DEFAULT">DEFAULT
<BR>
<input type="submit" name="pushbutton" value="Change">
<input type="submit" name="pushbutton" value="Delete">
<input type="submit" name="pushbutton" value="Start">
<input type="submit" name="pushbutton" value="Stop">
```

TABLE 6-continued

General Configuration and Administration (HTML)

```
<input type="submit" name="pushbutton" value="Restart">
</form>
<hr>To generate a new server instance, specify an instance
name and select the "Add" button.
<br>
<form ACTION="/QSYS.LIB/QTCPCGI.LIB/QTMHFMOU.PGM/instact"
METHOD="POST">
Instance name <input TYPE="text" NAME="instance" SIZE=10
MAXLENGTH=10> <input type="submit" name="pushbutton"
value= "Add">
</form>
<hr>Change the
<aHREF="/QSYS.LIB/QTCPCGI.LIB/QTMHFMIN.PGM/glblattr">
Global Attribute Values</a>.
<pre>
<hr>
<a href="/QSYS.LIB/QTCPCGI.LIB/QTMHICFP.PGM"><img
align=middle src="/QIBM/ICS/HTML/ICONS/go2first.gif"
alt="Front Page | "></a>    <a
href="/QIBM/ICS/HTML/MRI2924/HLPAS4IM.HTML"><img
align=middle src="/QIBM/ICS/HTML/ICONS/skyhelp.gif"
alt="Help"></a>
</pre>
</body>
</html>
```

Referring to FIG. 10, a sample representation page 400, the link "CHANGE", displayed in response to activating change button 376 in panel 370, is shown. In this example, on page 370 (FIG. 9), server instance "TEAM 42 " would have been previously created added through instance name field 386 and button 388. Returning to page 370, it would then show up in the list of instances, and would be selected for change by activating a button similar to default radio button 374 followed by change button 376 to get to page 400.

Server instance page 400 allows specification of the associated configuration file 314 used by this server instance. Radio buttons 406, 408 and 410 are selected to use an existing configuration 402, to create a new configuration or associate a different configuration with this instance, respectively. There are also links 416 and 418 to configuration and administration forms 460 (FIG. 12), and instance parameters forms 420 (FIG. 11), respectively.

Referring to Table 7, the HTML for generating panel 400 responsive to link CHANGE 376 is set forth.

TABLE 7

Link CHANGE (HTML)

```
// Sample HTML representation of link "CHANGE"
<html>
<head>
<title>Server Instance "DEFAULT    "</title>
</head>
<img src="/QIBM/ICS/HTML/ICONS/skycfg2.gif" align="middle"
alt=""><strong>Configuration and Administration</strong>
<p><hr>
<body>
<br>
<h1>Server Instance "TEAM42    "</h1>
<hr>
<form ACTION="/QSYS.LIB/QTCPCGI.LIB/QTMHFMOU.PGM/assccfg"
METHOD="POST">
<h2>Associated Configuration</h2>
This server instance uses the configuration named
<strong>CONFIG</strong>. To use a different one,
you choose the name of an existing configuration, specify the
name of a new configuration, or do both. Then, choose
the action you want to take.
<p>
<pre>
Existing configuration
<select NAME="assccfg"> <OPTION SELECTED>CONFIG
<OPTION>CONFIG_BK <OPTION>CONFIGSAVE
</select>
New configuration
<input TYPE="text" NAME="newcfg" maxlength=10 SIZE=10>
</pre>
<input TYPE=RADIO NAME="action" VALUE="1" Checked>
```

TABLE 7-continued

Link CHANGE (HTML)

Use existing configuration <br>
<input TYPE=RADIO NAME="action" VALUE="2">
Create new configuration <br>
<input TYPE=RADIO NAME="action" VALUE="3">
Create new configuration based on existing one
<pre>
<input type="submit" name="pushbutton" value="Apply">
<input name="pushbutton" type="reset" value="Reset">
</pre>
<hr>
<a HREF="/QSYS.LIB/QTCPCGI.LIB/QTMHFMIN.PGM/cfgact=CONFIG
">
<h2>Configuration and Administration Forms</h2>
</a>
Change the configuration named
<strong>CONFIG   </strong>.
<hr>
<a HREF="/QSYS.LIB/QTCPCGI.LIB/QTMHFMIN.PGM/instparm=DEFAULT
">
<h2>Instance Parameters</h2>
</a>
Specify parameter values to be used by server instance
<strong>DEFAULT   </strong>.
<INPUT TYPE=HIDDEN NAME="INSTANCE" VALUE="DEFAULT    ">
<pre>
<hr>
<a href=/QSYS.LIB/QTCPCGI.LIB/QTMHICFP.PGM"><img
align=middle src="/QIBM/ICS/HTML/ICONS/go2first.gif"
alt="Front Page |"></a>   <a
href="/QIBM/ICS/HTML/MRI2924/HLPAS4CF.HTML"><img
align=middle src="/QIBM/ICS/HTML/ICONS/skyhelp.gif"
alt="Help"></a>
</pre>
</form>
</body>
</html>

Referring to FIG. 11, a sample representation of link "INSTANCE PARAMETERS", the page 420 returned upon selecting instance parameters 418 (FIG. 10), is shown. This page 420 allows specification of particular "instance" values that can override configuration directives for server 422 for those inputs 424–446 shown on the page. In this specific example, such instance values, or parameters, include autostart 424, number of server jobs minimum 426 and maximum 428, coded character set identifier 430, server mapping tables outgoing 432, 434 and incoming 436, 438, access log file name 440, error log file name 442, non-secure port 444 and secure port 446. For example, specifying a non-secure port in field 444 would override any PORT directive in configuration file 316. These attribute values reflect the contents of a member in a file that is similar to file 318, except instead of being tied to server 310, this file is tied to server 311 (it is modified by server 310, used to control the behavior of server 311). The ADMIN instance is unique in that it uses two config file members. It first reads the one from the read-only file 314, then the one from the read-write file 316.

Referring to Table 8, the HTML code for generating a panel for an instance of TEAM 42, which will be like panel 420 of FIG. 11 (which is for a server instance of DEFAULT) is set forth. (In order for Table 8 to produce FIG. 11, "TEAM 42" in line 12 would have to be changed to "DEFAULT".)

TABLE 8

Instance Parameters (HTML)

// Sample HTML Representation of link "INSTANCE PARAMETERS"
<html>
<head>
<title>Instance Parameters</title>
</head>
<img src="/QIBM/ICS/HTML/ICONS/skycfg2.gif" align="middle"
alt=""> <strong>Configuration and Administration</strong>
<p><hr>
<body>
<br>
<h1>Instance Parameters</h1>
Server instance: <STRONG>TEAM42</STRONG>
<hr>
<form
ACTION="/QSYS.LIB/QTCPCGI.LIB/QTMHFMOU.PGM/instparm=DEFAULT"

TABLE 8-continued

Instance Parameters (HTML)

```
METHOD="POST">
Specify parameter values to be used by this server instance.
<p>
<pre>
Autostart
<select NAME="auto"> <option> NO <OPTION> YES <OPTION
SELECTED> *GLOBAL </SELECT>
Number of server jobs:
Minimum
<input   TYPE="text"
         NAME="min"
         VALUE ="*CFG"
         maxlength=4
         SIZE=4>
Maximum
<input   TYPE="text"
         NAME="max"
         VALUE="*CFG"
         maxlength=6
         SIZE=6>
Coded character set identifier
<input   TYPE="text"
         NAME="ccsid"
         VALUE="*GLOBAL"
         maxlength=7
         SIZE=7>
Server mapping tables:
Outgoing EBCDIC/ASCII table
<input   TYPE="text"
         NAME="outtbl"
         VALUE="*GLOBAL"
         max length=10
         SIZE=10>
Library
<input   TYPE="text"
         NAME="outlib"
         VALUE=""
         maxlength=10
         SIZE=10>
Incoming ASCII/EBCDIC table
<input   TYPE="text"
         NAME="intbl"
         VALUE="*GLOBAL"
         maxlength=10
         SIZE=10>
Library
<input   TYPE="text"
         NAME="inlib"
         VALUE =""
         maxlength=10
         SIZE=10>
ACCESS log file name
<input   TYPE="text"
         NAME="accfil"
         VALUE="*CFG"
         maxlength=512
         SIZE=50>
ERROR log file name
<input   TYPE="text"
         NAME="errfil"
         VALUE="*CFG"
         maxlength=512
         SIZE=50>
Non-secure port
<input   TYPE="text"
         NAME="prt"
         VALUE="*CFG"
         maxlength=5 SIZE=5>
Secure port
<input   TYPE="text"
         NAME="secprt"
         VALUE="*CFG"
         maxlength=5
         SIZE=5>
</pre>
<pre>
<input type="submit" name="pushbutton" value="Apply">
```

TABLE 8-continued

Instance Parameters (HTML)

```
<input type="reset" name="pushbutton" value="Reset">
<hr>
<a href="/QSYS.LIB/QTCPCGI.LIB/QTMHICFP.PGM">
<img align=middle src="/QIBM/ICS/HTML/ICONS/go2first.gif"
alt="Front Page |">
<a href="/QIBM/ICS/HTML/MRI2924/HLPAS4IN.HTML">
<img align=middle src="/QIBM/ICS/HTML/ICONS/skyhelp.gif"
alt="Help">
</a>
</pre>
</form>
</body>
</html>
```

Referring to FIG. 12, a sample representation of link configuration and administration forms panel 460, such as is displayed at browser 404 in response to selection of field 416 (FIG. 10) is set forth. This server configuration TEAM 42 may be customized by selecting and using one or more of forms 461. These forms include the following: basic form 462 (see form 500, FIG. 13 for a specific example) for specifying required settings; user administration forms 463 for managing user ID and passwords, including add user form 464 for adding a new user ID to a validation list and group file, delete user form 465 for deleting a user from a validation file, check user form 466 for determining if a user exists in a validation list, and change password form 467 for changing a user password in a validation list; directories and welcome page 468 for setting viewing options, including initial page 469 for specifying the welcome pages and directory lists, directory list contents 470 for specifying list columns, and readme text 471 for providing informative directory list text; logging form 472 for customizing the access log and error log, including global log file configuration settings form 473 for specifying log fomats, access log file configuration form 474 for specifying access log location, and error log file configuration form 475 for specifying error log location; access control form 476 for setting up access control for the server, including document protection form 477 for specifying file directories to protect, protection setups form 478 for specifying file protection settings, and access control lists 479 for defining user access files; security form 480 for setting up security for the server, including security configuration form 481 for defining basic parameters for security, create keys form 482 for creating keys and request certificates, receive certificate form 483 for receiving a certificate into the key ring, and key management form 484 for working with keys, root keys, and certificates; resource mapping form 485 for redirecting URLs and defining file extensions, including request routing form 486 for routing URL requests to server files, MIME encodings form 487 for defining encodings and extensions, MIME types form 488 for defining file types and extensions, and languages form 489 for associating language encodings and extensions; timeouts form 490 for closing connections automatically; methods form 491 for setting method acceptance; accessory scripts form 492 for specifying custom method scripts; and performance settings form 493 for defining performance settings, including jobs form 494 for configuring jobs.

Referring to Table 9, HTML coding for setting up configuration and administration forms panel 460 is set forth.

TABLE 9

Configuration and Administration (HTML)

```
// Sample representation of link "Configuration and
// Administration Forms"
<html>
<head>
<title>Configuration and Administration Forms</title>
</head>
<body>
<img src="/QIBM/ICS/HTML/ICONS/skycfg2.gif" align="middle"
alt ="">
<strong>Configuration and Administration</strong>
<p><hr>
<h1>Configuration and Administration Forms</h1>
Configuration: <strong>TEAM42</strong>
<p>
<hr>
You can customize this server configuration by modifying the
forms below:
<p>
<ul>
<li>
<ahref="/QSYS.LIB/QTCPCGI.LIB/QTMHCFIN.pGM/basic=CONFIG">
Basic
</a> - Specify required settings
<li>
<ahref="/QSYS.LIB/QTCPCGI.LIB/QTMHCFIN.PGM/useradm=CONFIG">
```

TABLE 9-continued

| Configuration and Administration (HTML) |
| --- |

User Administration </a>
    - Manage user ID and passwords
<ul>
<li>
<ahref="/QSYS.LIB/QTCPCGI.LIB/QTMHCFIN.PGM/adduser=CONFIG">
    Add User </a>
    - Add a new user ID to a validation list and group file
<li>
<ahref="/QSYS.LIB/QTCPCGI.LIB/QTMHCFIN.PGM/deluser=CONFIG">
    Delete User </a>
    - Delete a user from a validation list
    <li>
    <ahref="/QSYS.LIB/QTCPCGI.LIB/QTMHCFIN.PGM/chkuser=CONFIG">
    Check User</a>
    - Determine if a user exists in a validation list
<li>
<ahref="/QSYS.LIB/QTCPCGI.LIB/QTMHCFIN.PGM/chpasswd=CONFIG">
Change Password</a>
    - Change a user password in a validation list
    </ul>
    <li>
    <ahref="/QSYS.LIB/QTCPCGI.LIB/QTMHCFIN.PGM/dirappr=CONFIG">
    Directories and Welcome Page</a>
    - Set viewing options
<ul>
<li>
<ahref="/QSYS.LIB/QTCPCGI.LIB/QTMHCFIN.PGM/initpage=CONFIG">
Initial Page</a>
    - Specify welcome pages and directory lists
<li>
<ahref="/QSYS.LIB/QTCPCGI.LIB/QTMHCFIN.PGM/listcnts=CONFIG">
Directory List Contents</a>
    - Specify list columns
<li>
<ahref="/QSYS.LIB/QTCPCGI.LIB/QTMHCFIN.PGM/dirreadm=CONFIG">
Readme Text</a>
    - Provide informative directory list text
</ul>
<li><ahref="/QSYS.LIB/QTCPCGI.LIB/QTMHLRIN.PGM/logging=CONFIG">
Logging</a>
    - Customize access log and error log
<ul>
<li>
<ahref="/QSYS.LIB/QTCPCGI.LIB/QTMHLRIN.PGM/logfiles=CONFIG">
Global Log File Configuration Settings</a>
    - Specify log formats
<li>
<ahref="/QSYS.LIB/QTCPCGI.LIB/QTMHLRIN.PGM/accconf=CONFIG">
    Access Log File Configuration</a>
    - Specify access log location
<li>
<ahref="/QSYS.LIB/QTCPCGI.LIB/QTMHLRIN.PGM/errconf=CONFIG">
    Error Log File Configuration</a>
    - Specify error log location
    </ul>
<li>
<ahref="/QSYS.LIB/QTCPCGI.LIB/QTMHCFTN.PGM/access=CONFIG">
    Access Control</a>
    - Set up access control for the server:
<ul>
<li>
<ahref="/QSYS.LIB/QTCPCGI.LIB/QTMHCFIN.PGM/docautos=CONFIG">
Document Protection</a>
    - Specify file directories to protect
<li>
<ahref="/QSYS.LIB/QTCPCGI.LIB/QTMHCFIN.PGM/prtclist=CONFIG">
Protection Setups</a>
    - Specify file protection settings
<li>
<ahref="/QSYS.LIB/QTCPCGI.LIB/QTMHCFIN.PGM/acldir=CONFIG">
    Access Control Lists</a>
    - Define user access files
</ul>
<li>
<ahref="/QSYS.LIB/QTCPCGI.LIB/QTMHSCIN.PGM/security=CONFIG">
Security</a>
    - Set up security for the server:

TABLE 9-continued

Configuration and Administration (HTML)

```
<ul>
<li>
<ahref="/QSYS.LIB/QTCPCGI.LIB/QTMHSCIN.PGM/secconf=CONFIG">
     Security Configuration</a>
     - Define basic parameters for security
<li>
<ahref="/QSYS.LIB/QTCPCGI.LIB/QTMHSCTN.PGM/key=CONFIG">
     Create Keys</a>
     - Create keys and request certificates
<li>
<ahref="/QSYS.LIB/QTCPCGI.LIB/QTMHSCIN.PGM/reccert=CONFIG">
     Receive Certificate</a>
     - Receive a certificate into the key ring
<li>
<ahref="/QSYS.LIB/QTCPCGI.LIB/QTMHSCIN.PGM/pwprompt=CONFIG">
Key Management</a>
     - Work with keys, root keys, and certificates
</ul>
<li>
<ahref="/QSYS.LIB/QTCPCGI.LIB/QTMHCFIN.PGM/resmap=CONFIG">
     Resource Mapping</a>
     - Redirect URLs and define file extensions
<ul>
<li>
<ahref="/QSYS.LIB/QTCPCGI.LIB/QTMHCFIN.PGM/mpfrule=CONFIG">
     Request Routing</a>
     - Route URL requests to server files
<li>
<ahref="/QSYS.LIB/QTCPCGI.LIB/QTMHCFIN.PGM/addencod=CONFIG">
MIME Encodings</a>
     - Define encodings and extensions
<li>
<ahref="/QSYS.LIB/QTCPCGI.LIB/QTMHCFIN.PGM/addtype=CONFIG">
     MIME Types</a>
     - Define file types and extensions
<li>
<ahref="/QSYS.LIB/QTCPCGI.LIB/QTMHCFIN.PGM/addlang=CONFIG=>
     Languages </a>
     - Associate language encodings and extensions
</ul>
<li>
<ahref="/QSYS.LIB/QTCPCGI.LIB/QTMHCFIN.PGM/timeout=CONFIG">
TimeOuts</a>
     - Close connections automatically
<li>
<ahref="/QSYS.LIB/QTCPCGI.LIB/QTMHCFIN.PGM/methenab=CONFIG">
Methods</a>
     - Set method acceptance
<li>
<ahref="/QSYS.LIB/QTCPCGI.LIB/QTMHCFIN.PGM/accscr=CONFIG">
Accessory Scripts</a>
     - Specify custom method scripts
<li>Performance Settings</a>- Define performance settings:
<ul>
<li>
<ahref="/QSYS.LIB/QTCPCGI.LIB/QTMHCFIN.PGM/performa=CONFIG">
Jobs</a>
          - Configure jobs
</ul>
</ul>
<hr>
<a href="/QSYS.LIB/QTCPCGI.LIB/QTMHICFP.PGM">
<img src="/QIBM/TCS/HTML/ICONS/go2first.gif"
alt="Front Page |"></a>
<img src="/QIBM/ICS/HTML/ICONS/greycfg.gif"
alt="Configuration and Administration Forms |">
<a href="/QIBM/ICS/HTML/MRI2924/sample.html">
<img src="/QIBM/ICS/HTML/ICONS/skyhome.gif"
alt="Sample Home Page |"></a>
<a href="http://www.ics.raleigh.ibm.com/">
<img src="/QTBM/ICS/HTML/ICONS/skyres.gif"
alt="Resource List |"></a>
<a href="/QIBM/ICS/HTML/MRI2924/rzag1mst.html">
<img src="/QIBM/ICS/HTML/ICONS/skydoc.gif"
alt="Documentation"></a>
```

TABLE 9-continued

Configuration and Administration (HTML)

</body>
</html>

Referring further to FIGS. 1 and 2, if the auto start attribute for administration server 310 is set to *NO, this server 310 starts only upon command, such as the AS/400 STRTCPSVR(*HTTP)(*ADMIN) command. The system administrator may, however, using the browser, configure the default autostart attribute for any server instance 310, 311 to yes, and thus may configure ADMIN server instance 310 so that it will autostart.

Referring again to FIG. 3, to add a new instance of an HTTP server, the user types in an instance name 371 and selects ADD 388. The user will then be shown a confirmation page, can then return to page 400, and select 418 to get the instance parameters page.

Referring further to FIG. 9, the link "Global attribute values" 390 shows an additional page similar to that in FIG. 11 to allow modification of the default HTTP server 311 attributes 323. These default attributes are those which are modified with the CHGHTTPA command, and are shown in FIG. 15, global attribute file 532.

Referring further to FIGS. 10 and 11, a configuration for a particular instance of an HTTP server is illustrated. In such a case, the configuration name is mandatory as this is the configuration used by this instance of the HTTP server. Different instances may use the same or unique configurations. If instances share configurations, and need to co-exist, certain override parameters must be specified. For example, if a port directive is in the configuration, and two instances share that configuration, only one of the instances will start up the other instance will fail unless there is an override parameter in the appropriate PORT field.

Once "apply" 448 is chosen, messages indicate the outcome, which may be either the instance is not changed successfully or the instance is changed. "Reset" 450 resets values back to previously defined values, which may include blank fields.

Figure 15:
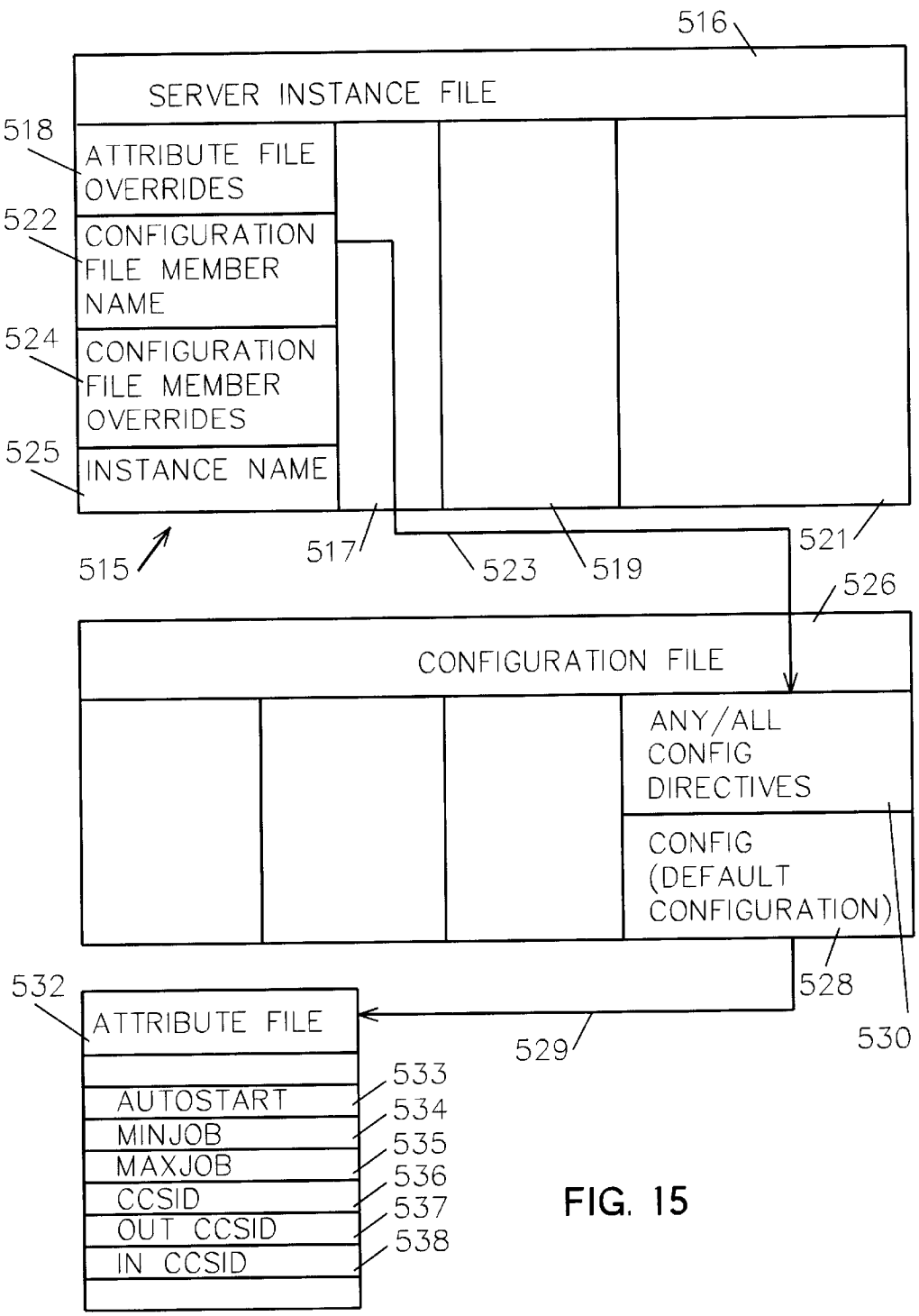
FIG. 15 is a diagram illustrating secure server instance management files and formats.

Referring to FIG. 9, if the link "Global Attribute Values" 390 is selected in panel 370, a page is produced which allows setting of the values of 533, 534, 535, 536, 537, and 538 in FIG. 15.

Referring further to FIG. 10, the sample page illustrated is an indication of what is required on a configuration page. A system administrator can change attributes for this instance via link 418; designate what configuration file is used via items 402, 404, 406, 408, 410, 412, and 414; and specify configuration file values via link 416.

Figure 13:
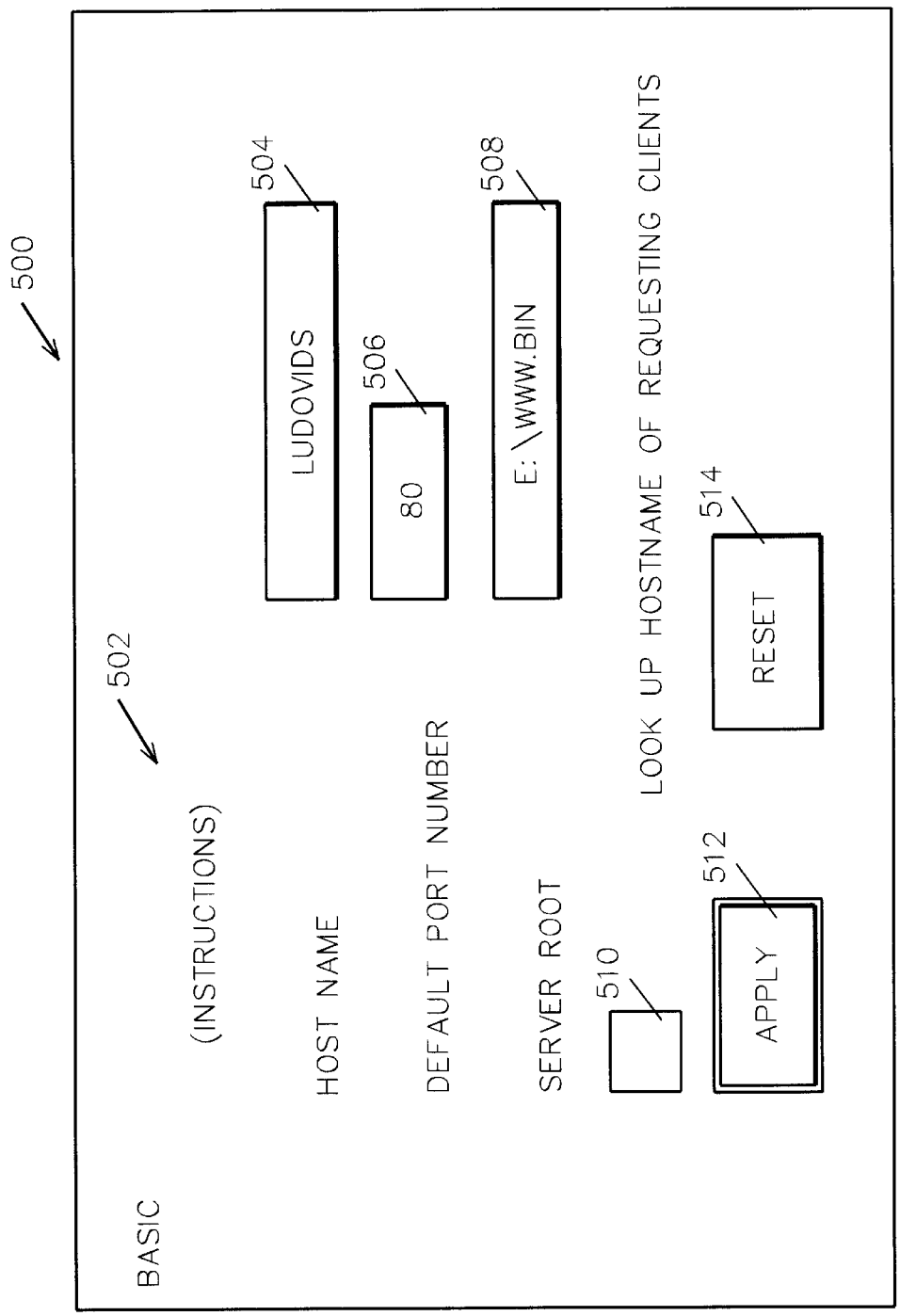
FIG. 13 is a diagram illustrating a basic page.

Referring to FIG. 13, a sample page illustrates basic panel 500. This panel 500 is displayed responsive to selection of link 462 in panel 460, FIG. 12. Instructions 502 may include a statement displayed on the browser in panel 500, such as the following:

"Specify the host name of the computer on which the server is installed, the port number on which the server listens for requests, and the directory the server uses as the root of the data hierarchy (server root). Host name should be a fully qualified name. Default port number should be the well-known HTTP port number ( 80), or a port number above 1024. Port numbers less than 1024 may be reserved by other programs."

Representative data entry fields on page 500 include host name 504, default port number 506, server root 508. Button 510 is activated to look up the host name of requesting clients, button 512 to apply, and 514 to reset.

This panel 500 is representative of the many similar panels which would be displayed by selection in panel 460 of links 463–494.

Referring to FIG. 14, a sample page illustrates the contents of confirmation panel, which is displayed back to the user at browser 304 in response to data entered via basic page 500.

Referring to FIG. 15, secure server instance management files and formats are illustrated for enabling management of multiple server instances.

Referring to FIG. 15 in connection with FIG. 2, in accordance with the preferred embodiment of the invention, one of the server instances is default server instance 311, and another is the ADMIN server 310 instance that is used for the browser interface to the configuration and administration utilities.

Multiple HTTP server instance management is handled by using instance file (*PF) 516, configuration file (*SRCPF) 526, and attribute file (*PF) 532.

Each member 515, 517, 519, 521 of instance file 516 represents a single HTTP server instance. Instance name 525 is not actually contained within each member of 516, but rather is used to determine which member within file 516 is accessed. Instance file 516 is the same as instance file 318 (FIG. 1), and file 515 is a member within file 516. A particular member 515 defines an instance. Each instance (member) 515, 517, 519, 521 contains optional attribute overrides 518, configuration file member name 522, and optional configuration directive overrides 524. The instance (member) name 525 is used to specify the server instance for configuration and administration purposes. Optional attribute overrides 518 are used to override the values in attribute file 532 for this server instance 515. Configuration file member name 522 identifies, as is represented by line 523, the configuration file member 526 from which server instance 515 reads configuration directives 530 at server startup. Optional configuration directive overrides 524 are used to override configuration directives such as port, sslport, AccessLog and ErrorLog. Each member in configuration file 526 (only one member is shown) represents a set of directives 528, 530 that can be used by server instance 515, 517, 519, 521 at startup time. In accordance with a preferred embodiment of the invention, attribute file 532 includes only one member with fields autostart 533, minjob 534, maxjob 535, ccsid 536, out ccsid 537 and in ccsid 538. Minjob 534 and maxjob 535 attributes map to MinActiveThreads and MaxActiveThreads to enable a job structure to be implemented on a thread model, as is further described in U.S. Pat. No. 6,272,518 filed Aug. 17, 1998 (supra).

Figure 16:
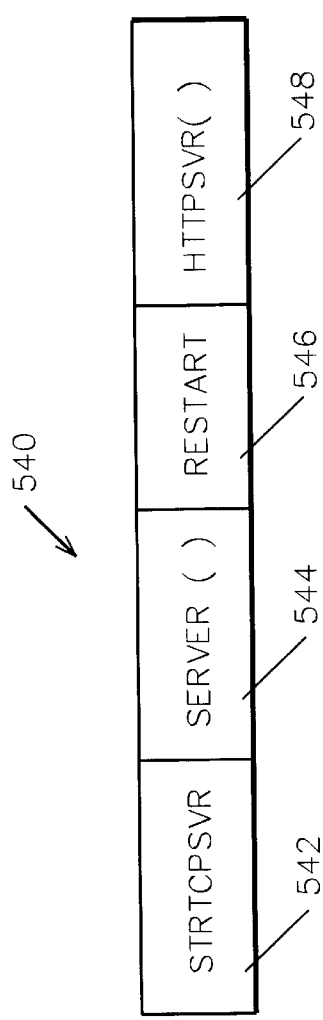
FIG. 16 is a diagram illustrating the format of the start server command.
Figure 17:
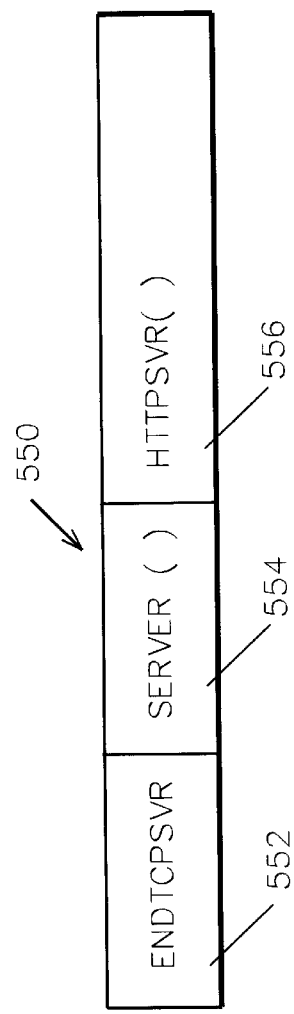
FIG. 17 is a diagram illustrating the format of the end server command.

Referring to FIGS. 16 and 17, the STRTCPSVR 540 and ENDTCPSVR 550 commands are adapted to support multiple server instances. Use of SYTRTCPSVR command 540 is an alternative to use of the browser based ADMIN server to create startup values in the instance file.

Referring to FIG. 16, the format of start TCP server command 540 is illustrated, which includes STRTCPSVR field 542, SERVER() field 544, RESTART field 546 and HTTPSVR() field 548. The start TCP/IP server command 540 is used to start the TCP/IP application servers. The syntax of STRTCPSVR statement 540 is as follows:

| | |
|---|---|
| STRTCPSVR field 542: | STRTCPSVR |
| SERVER( ) field 544: | SERVER(\|*ALL\|\|*SNMP\|*ROUTD\|*TELNET\| *FTP\|*SMTP\|*LPD\|*WSG\|*POP\|*HTTP\| . . . \|) |
| RESTART field 546: | RESTART(\|*NONE\|*HTTP\|) |
| HTTPSVR( ) field 548: | HTTPSVR(\|*ALL\|\|server-instance-name \|*ADMIN\|\|* NONE\|instance-startup-values\| | where:
SERVER specifies the TCP/IP application servers to be started by this command.
*ALL specifies that all of the TCP/IP application servers and all HTTP instances are started.
*SNMP specifies that simple network management protocol (SNMP) agent jobs are started.
*ROUTED specifies that the RouteD server is started.
*TELNET specifies that the TELNET server is started. More than one TELNET server job may be running.
*FTP specifies that file transfer protocol (FTP) servers are started based on the number of servers configured with a change FTP attributes (CHGFTPA) command. More than one FTP server job may be running.
*SMTP specifies that the simple mail transfer protocol (SMTP) client and server jobs are started.
*LPD specifies that line printer daemon (LPD) servers are started based on the number of servers configured with the change LPD attributes (CHGLPDA) command. More than one LPD servers may be running.
*WSG specifies the 5250/ Hypertext markup language (HTML) workstation gateway (WSG) server is started.
*POP specifies the post office protocol (POP) version 3 servers are started based on the number of servers configured with the change POP attributes (CHGPOPA) command.
*HTTP specifies the world wide web hyptertext transfer protocol (HTTP) servers are started based on the number of servers specified in the change HTTP attributes (CHGHTTPA) command.
RESTART specifies whether to restart the selected server when the STRTCPSVR command 540 is run. The SERVER parameter 544 must be *ALL or *HTTP or this parameter is ignored. *NONE specifies that no server is to be restarted. *HTTP specifies that the HTTP server is to be restarted if already running, thus forcing the HTTP server to read in the HTTP configuration and use any configuration values or attributes that have changed since it was last started.
HTTPSVR( ) specifies the HTTP server instance to be started as well as any additional startup values to be used by the HTTP server to control the server instance.
*ALL specifies that all sever instances for the HTTP server will be started.
server-instance-name specifies the server instance will be started.
*ADMIN specifies that the administration HTTP server will be started. This administration server is an instance of the HTTP server that allows administration of system functions using a web browser.
instance-startup-values specifies additional startup values to be used for this server instance. The user is required to have *IOSYSCFG special authority to specify overrides. These values are used to override previously defined server startup values for the specified server instance, and are as follows:

netcp[nnn] overrides the DefaultNetCp directive.
fscp[nnn] overrides default DefaultFsCP directive.
p[nnn] overrides port directive.
sslport[nnnn] overrides SSLPort directive.
r[configuration file] overrides configuration file for this instance of the server.
l[log-file-name] same as "AccessLog log-file-name"
newlog[log-file-name] same as "AccessLog log-file-name and
Logformat Common".
ddslog[log-file-name] same as "AccessLog log-file-name and Logformat DDS".
errlog[logo-file-name] same as "ErrorLog log-file-name".
minat[nn] overrides the MinActiveThreads directive.
maxat[nn] overrides the MaxActiveThreads directive.
instance-startup-values specified on the STRTCPSVR *HTTP command take precedence or can augment configuration data in instance files. Instance files take precedence over or can augment data in configuration files.

EXAMPLES:
STRTCPSVR SERVER(*ALL): starts all of the TCP/IP application servers that have been configured. If the change FTP attributes (CHGFTPA) command was previously used to configure two FTP servers, both servers are started when STRTCPSVR is issued. Where appropriate, the number of servers to start is based on the number of servers configured for the server being started. The configuration option to automaticaly start the servers (AUTOSTART) is ignored by the STRTCPSVR command 540. The AUTOSTART parameteris only used by the STRTCP command.
STRTCPSVR SERVER(*TELNET): starts the TCP/IP TELNET application server. If the TELNET server was previously started, one additional TELNET server job is started.
STRTCPSVR SERVER(*HTTP) RESTART(*HTTP): restarts the TCP/IP HTTP application server for all instances of the HTTP server. If the HTTP server was not currently running, then all defined instances of the HTTP server are started.
STARTCPSVR SERVER(*HTTP) HTTPSVR(http1): starts the TCP/IP HTTP application server instance named 'http1' using the startup values prevously defined for this server instance.
STRTCPSVR SERVER(*HTTP) HTTPSVR(HTTP 1 '-p 81 -sslport 443 '): starts the TCP/IP HTTP application server instance named 'http1', and specifies that the server instance should listen on port 81 for unsecure requests and on port 443 for secure requests. The ports defined here override any previously defined ports used by this server instance.

Referring to FIG. 17, the format of end TCP server command 550 is illustrated, which includes ENDTCPSVR field 552, SERVER() field 554 and HTTPSVR() field 556. ENDTCPSVR command 550 is used to end the TCP/IP application server jobs that are specified in the SERVER parameter 554. If the jobs have any current active connections, these connections are ended immediately. The syntax of the ENDTCPSVR command 550 is as follows:

| | |
|---|---|
| ENDTCPSVR field 552: | ENDTCPSVR |
| SERVER() field 554: | SERVER(|*SNMP|*ROUTED|*TELNET|*FTP|*SMTP|*LPD|*HTTP|*WSG|*POP| . . . |*ALL| |
| HTTPSVR() field 556: | HTTPSVR(|*ALL|server-instance-name|*ADMIN| | where:
server-instance-name specifies the HTTP server instance to be ended.
Examples:
ENDTCPSVR SERVER(*ALL) ends all active TCP/IP application server jobs.
ENDTCPSVR SERVER(*HTTP) HTTPSVR(http1) ends the TCP/IP HTTP application server instance named 'http1'.
In a typical startup scenario:
(1) a user initializes operation by installing several files, including default configurations for both the ADMIN HTTP server 310 and default servers 311, and issues a start TCP (STRTCP) which causes the TCP/IP stack to start, and any TCP application that has AUTOSTART=*YES starts.
(2) However, because the default attribute file 323 has AUTOSTART=*NO for HTTP servers, and there is, in the preferred embodiment, no override for the ADMIN instance (attribute file 318), the user must run an explicit command to start the ADMIN server 310. (That command is STRTCPSVR 540, infra.) This is true only initially, before the ADMIN server 310 is started for the first time. The user can change the autostart attribute in the ADMIN server's instance file via browser-based config. If the admin server is not running, the only way to start is with STRTCPSVR, because it is the admin server that provides the browser-based config function. Other instances can then be started thru the browser (which actually does STRTCPSVR under the covers).
(3) In response to the STRTCP command, because server 310 has basic authentication enabled, the user is required to enter a valid user ID and password in order to further configure the server.
(4) Once authorized, the user issues STRTCPSVR 540 or STRTCPSVR(*HTTP), or points the browser to the ADMIN server and selects "default server" and "start". An HTTP server with a standard default configuration that serves only a "welcome.html" document is started on the standard HTTP port 80 for this host.
(5) The user then configures the server (either by the browser and selecting "which server" and "configure" or WRKHTTPCFG(*configuration)). Using either method, the user is able to (by configuration name): select a configuration file, and then change that particular configuration file.

Figure 18:
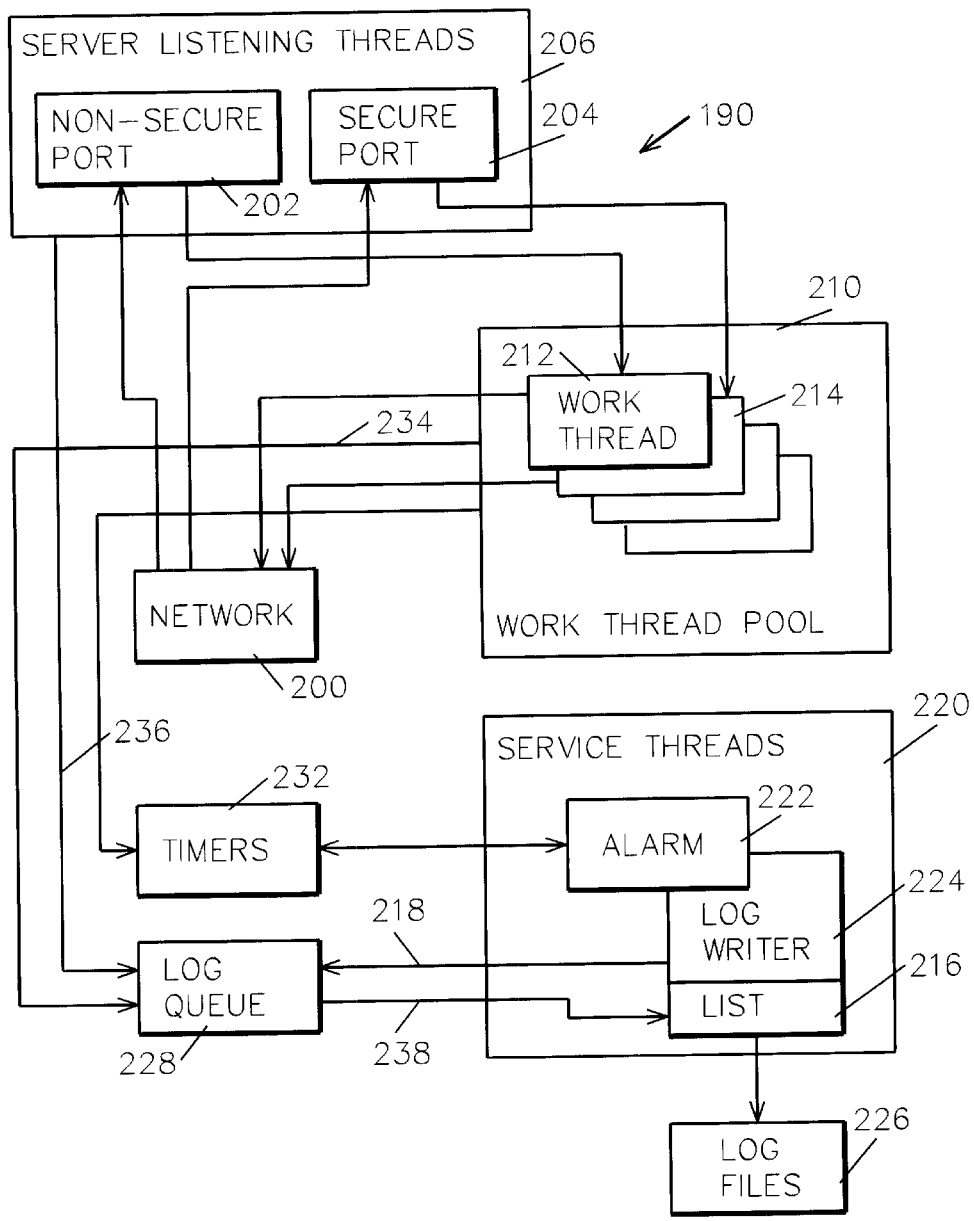
FIG. 18 is a high level system diagram illustrating server threading.

Referring to FIG. 18, in accordance with the Internet connection secure server embodiment of the invention, a server can listen on both a secure port 204 using secure sockets layer (SSL) and a non-secure port 202 using sockets for requests coming from HTTP clients on network 200. When a listening thread 206 detects a request coming into port 202 or 204 from network 200, it passes the socket descriptor for the request off to a worker thread 212 or 214 that is waiting in a thread pool 210 of initialized threads. Worker thread 212 or 214 processes the request and completes the transaction by sending a response back to the HTTP client on network 200. Service threads 220 run in the background to handle server utility functions including alarm 222 and log writer 224.

Figure 19:
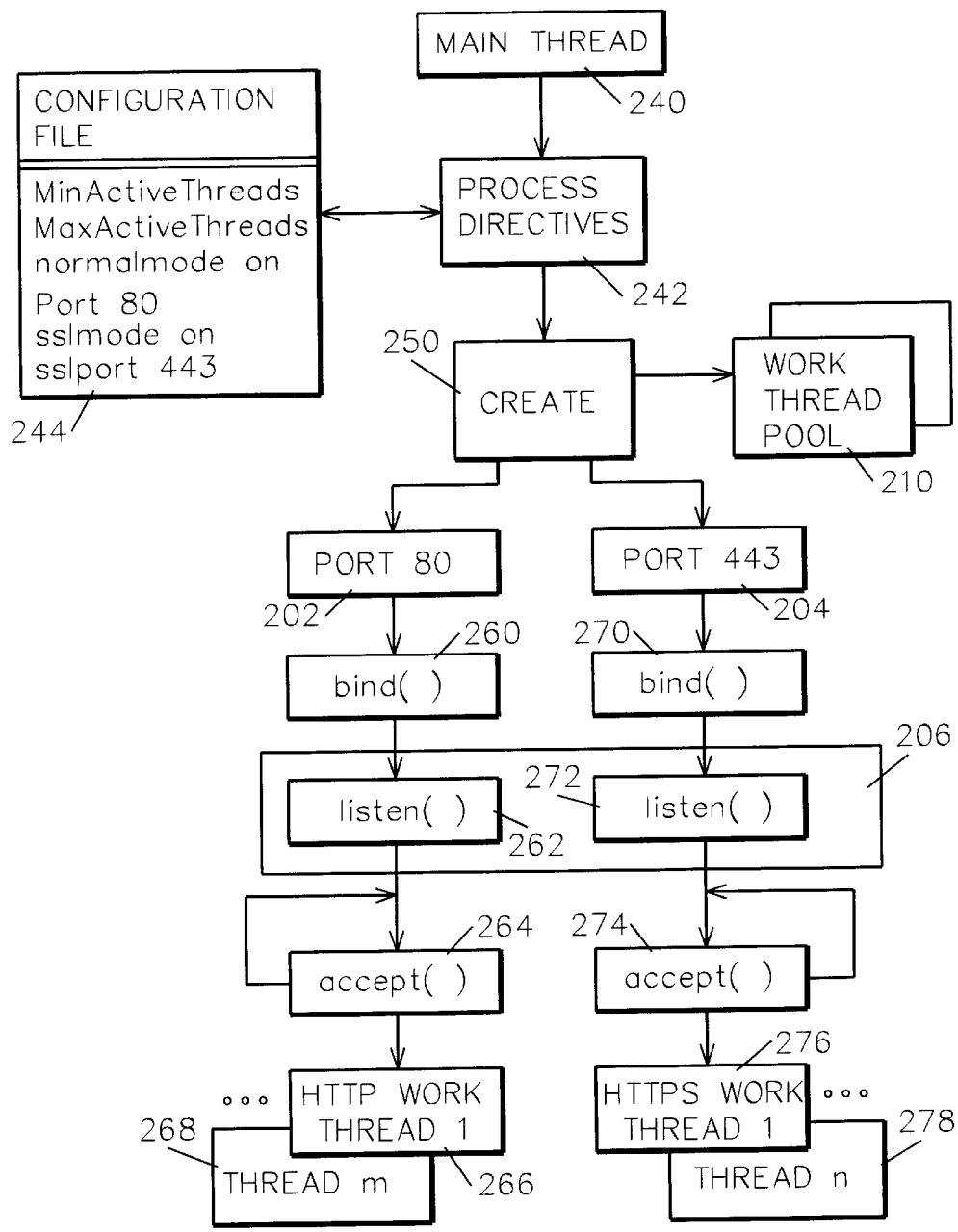
FIG. 19 is a high level flow diagram illustrating server threading flow.

Referring to FIG. 19 in connection with FIG. 18, as part of initialization, main thread 240 processes configuration file 244 directives. The MinActiveThreads and MaxActiveThreads directives are used to set the boundaries of the pool 206, 210, 220 of available threads that can be used by the server 190. Main program thread 240 initializes thread pool 210 and then uses a thread 202 from pool 210 to bind() 260 and listens 262 on an IP address port 202. When server 190 is started with directives normalmode on and sslmode on there will be one thread 206, 262 listening on port 80 (the HTTP default port 202) and one thread 206, 272 listening on port 443 (the HTTPS default port 204). Hereafter, these threads may be referred to as listing threads, or parent threads. HTTP and HTTPS default ports 202, 204 can be overriden with a directives port (for (HTTP) and an sslport (for HTTPS). These threads 206 will listen on all IP addresses defined for this host unless the BindSpecific directive is in configuration file 244 and it contains a valid IP address for this host. Then threads 206 only listen on the ports for that IP address.

When a request comes in on either or both ports 202, 204, the listening thread 262, 272 does an accept 264, 274 and passes the incoming request off to a work thread 266, 276 that comes from thread pool 210. Listening thread 262, 272 then goes back to accepts mode 264, 274. The work thread 266, 276 processes the incoming request and sends a response to the client. When work thread 266, 276 completes its tasks it returns to pool 210 of available threads.

Two service threads 220, including log writer thread 224 and alarm thread 222, are spun off at server 190 initialization and wait in the background until their services are needed.

Log writer routine 224 is spun off in its own thread when server 190 starts. It spends most of its time sleeping, but wakes up periodically to write out to log files 226 anything that needs to be logged. It handles writing to the access and error logs.

At initialization, startup job 240, 250 opens the log files 226 that are specified in configuration directives 244 (or over-rides) and then passes the file descriptors to the log writer thread 224. As is represented by lines 234 and 236, server listening threads 206 and worker threads 210 add log data to log queue 228 for log writer thread 224 to log. When log writer thread 224 wakes up it checks queue 228 for data to be logged. When there is data to be logged, log writer thread 224 locks the queue with a mutually exclusive (mutex) lock on line 218 and, as is represented by line 238, copies the log data from queue 228 into list 216, zeros out queue 228, and then releases mutex 218. Log writer thread 224 can then log the data from list 216 without having other threads 206, 210 blocked from writing to queue 228.

Alarm thread 222 is spun off (spawned) in its own thread when server 190 starts. It spends most of its time sleeping. It wakes up periodically and checks a list of timers 232 that are associated with active work threads 210, such as 266, 268, 276, 278. When a timer 232 expires it indicates that a work thread 210 had a problem completing its task on time. When alarm thread 222 finds an expired timer the timer is removed from the list of timers 232, the outstanding function being processed is terminated, and the socket 202, 204 being used by the request is closed.

Figure 20:
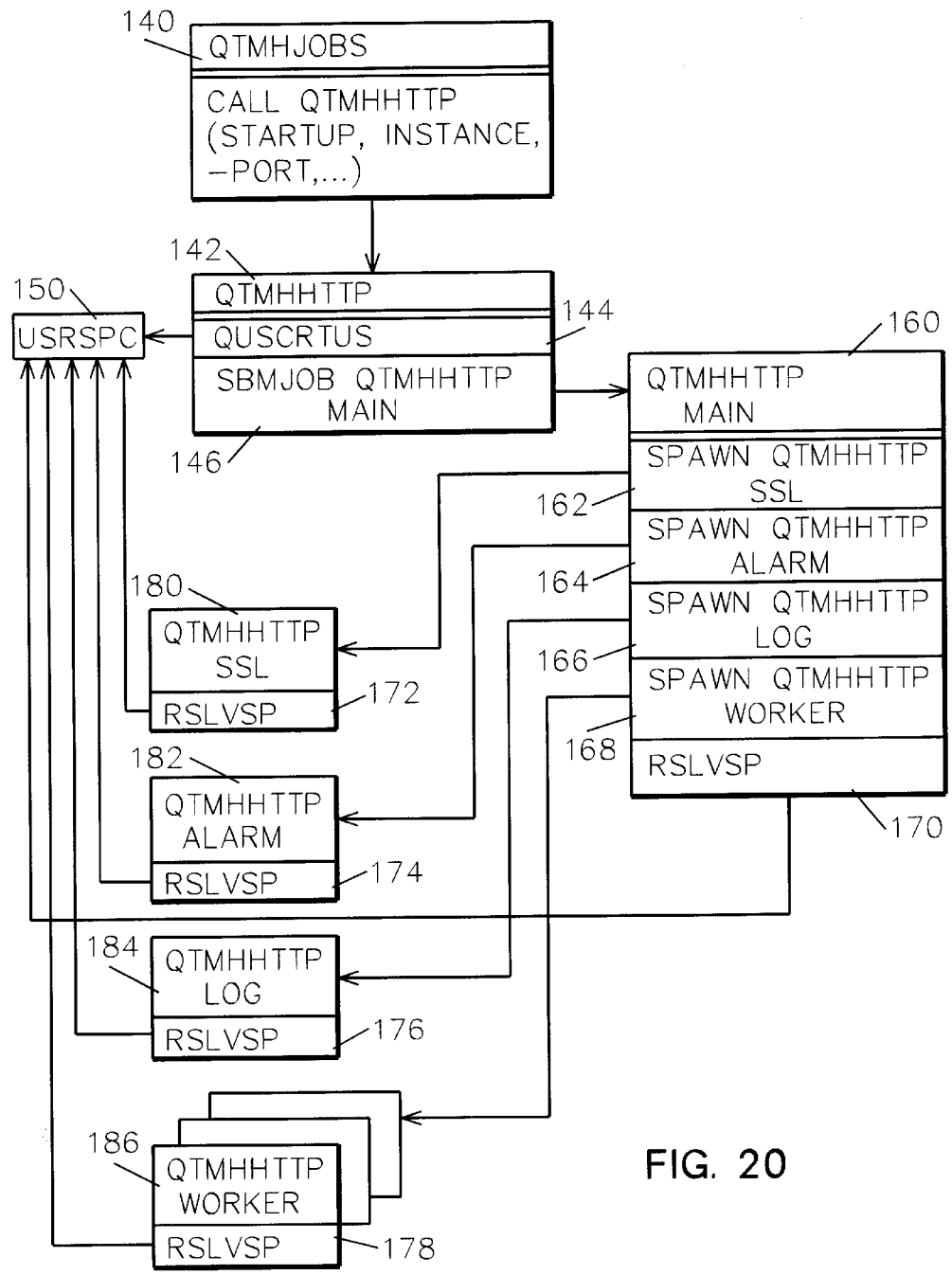
FIG. 20 illustrates the job structure of the HTTP server of the preferred embodiment of the invention.

Referring to FIG. 20, in accordance with a specific embodiment of the invention, various AS/400 jobs are started to support an HTTP server 190. A main job 160 is created that will then create additional jobs SSL 180, alarm 182, log 184, and worker 178. Upon properly configuring SSL, a spawn() 162 is issued to create job SSL 180 that will then listen 272 on port 204 for https requests. This job SSL 180 becomes a listening, or parent job to, for example, worker jobs 186. In addition, a number of worker jobs 186 are created (spawn 168) that are kept in a pool and at a later time are dispensed as appropriate with units of work (either requests for documents or to execute CGI programs). Finally, spawn log 166 creates log job 184 and spawn alarm 164 creates alarm job 182. USRSPC 150 is used to share global data across these jobs. USRSPC 150 is a system domain object that is uniquely named per server or worker job instance with the instance name and is located in the QHTTP library.

Advantages over the Prior Art

The advantages of the method of the preferred embodiment of this invention include the provision of an improved administration server which serves administration and configuration applications to a browser's graphical user interface.

It is a further advantage of the invention that there is provided an administration server which serves to a browser capability for administering and configuring web enabled system components.

It is a further advantage of the invention that there is provided an improved administration server which is isolated from other servers at the site.

It is a further advantage of the invention that there is provided an improved administration server which is isolated from other servers at the site such that loading of either does not adversely impact the other.

It is a further advantage of the invention that there is provided an improved administration server which enables the management of multiple copies or instances of servers.

It is a further advantage of the invention that there is provided an administration server implemented as a browser.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for managing a plurality of instances of Internet connection servers on a single host, comprising the steps of:

operating a web browser to display and interact with a plurality of HTML forms and corresponding common gateway interface binary programs provided selectively for:
creating a plurality of instances of servers of the same server type on said single host;
deleting instances of servers on said single host;
associating a single instance of a configuration file with each server instance of said same server type as each said server instance is created on said single host;
changing each server instance start-up parameters on said single host;
starting server instances on said single host;
ending server instances on said single host; and
restarting server instances on said single host.

2. A server system including a web browser, comprising:

a plurality of server instances of a same server type on a single host, with one said server instance operable to display at said browser a plurality of forms and associated programs selectively for
creating instances of servers on said single host;
deleting instances of servers on said single host;
associating a given configuration file with each server instance as said server instance is created on said single host;
changing server instance start-up parameters;
starting server instances on said single host;
ending server instanceson said single host; and
restarting server instanceson said single host.

3. A program storage device readable by a machine, tangibly embodying a program of instructions executable by a machine to perform method steps for managing a plurality of instances of Internet connection servers of a same server type on a single host, said method steps comprising:

operating a web browser to display and interact with a plurality of HTML forms and corresponding common gateway interface binary programs provided selectively for:
creating a plurality of instances of said servers of a same server type on said single host;
deleting instances of servers on said single host;
associating a configuration file with each said server instance created on said single host;
changing server instance start-up parameters on said single host;
starting server instances on said single host;
ending server instances on said single host; and
restarting server instances on said single host.

4. An article of manufacture comprising:

a computer usable medium having computer readable program code means embodied therein for managing a plurality of instances of Internet connection server type on a single host, the computer readable program means in said article of manufacture comprising:
computer readable program code means for causing a computer to effect operating a web browser to display and interact with a plurality of HTML forms and corresponding common gateway interface binary programs provided selectively for:
creating a plurality of instances of said servers of a same server type on said single host;
deleting instances of servers on said single host;
associating a single instance of a configuration file with each said server instance;
changing server instance start-up parameters on said single host;
starting server instances on said single host;
ending server instances on said single host; and
restarting server instances on said single host.

* * * * *

UNITED STATES PATENT AND TRADEMARK OFFICE
CERTIFICATE OF CORRECTION

PATENT NO.    : 6,567,849 B2
DATED         : May 20, 2003
INVENTOR(S)   : David S. Ludovici and Frank V. Paxhia It is certified that error appears in the above-identified patent and that said Letters Patent is hereby corrected as shown below:

<u>Column 48,</u>
Lines 21 and 22, "instanceson" should be -- instances on --.
Line 35, after "a" insert -- given --.
Line 45, after "connection" insert -- servers of a same --.

Signed and Sealed this

Ninth Day of September, 2003

JAMES E. ROGAN
*Director of the United States Patent and Trademark Office*